United States Patent [19]
Clark et al.

[11] Patent Number: 5,979,114
[45] Date of Patent: Nov. 9, 1999

[54] ELECTRONIC CONTROL AND METHOD FOR POWER SLIDING VAN DOOR WITH REAR-CENTER-MOUNTED DRIVE

[75] Inventors: Marian E. Clark, Bellbrook; Harry C. Buchanan, Jr.; James A. Jackson, Jr., both of Dayton, all of Ohio

[73] Assignee: Valeo Electrical Systems, Inc., Auburn Hills, Mich.

[21] Appl. No.: 09/164,681

[22] Filed: Oct. 1, 1998

Related U.S. Application Data

[63] Continuation-in-part of application No. 08/908,126, Aug. 11, 1997, Pat. No. 5,906,071, which is a continuation of application No. 08/575,643, Dec. 20, 1995, abandoned, which is a continuation-in-part of application No. 08/501,557, Jul. 12, 1995, Pat. No. 5,582,279.

[51] Int. Cl.⁶ .......................................................... B60J 5/06
[52] U.S. Cl. ................................................ 49/360; 49/214
[58] Field of Search ................................ 296/146.4, 155; 49/214, 215, 280, 360; 292/341.16

[56] References Cited

U.S. PATENT DOCUMENTS

| | | | |
|---|---|---|---|
| 4,617,757 | 10/1986 | Kagiyama et al. | 49/280 |
| 4,640,050 | 2/1987 | Yamagishi et al. | 49/280 |
| 4,707,007 | 11/1987 | Inoh | 292/341.16 |
| 4,775,178 | 10/1988 | Boyko | 292/341.16 |
| 4,842,313 | 6/1989 | Boyko et al. | 292/341.16 |
| 4,862,640 | 9/1989 | Boyko et al. | 49/213 |
| 4,887,390 | 12/1989 | Boyko et al. | 49/214 |
| 4,916,861 | 4/1990 | Schap | 49/31 |
| 4,982,984 | 1/1991 | Yokota et al. | 292/201 |
| 4,984,385 | 1/1991 | DeLand | 49/280 |
| 5,025,591 | 6/1991 | DeLand et al. | 49/360 |
| 5,039,925 | 8/1991 | Schap | 318/282 |
| 5,046,283 | 9/1991 | Compeau et al. | 49/138 |
| 5,062,241 | 11/1991 | DeLand | 49/460 |
| 5,063,710 | 11/1991 | Schap | 49/280 |
| 5,066,056 | 11/1991 | Schap | 292/341.16 |
| 5,069,000 | 12/1991 | Zuckerman | 49/28 |
| 5,076,016 | 12/1991 | Adams et al. | 49/360 |
| 5,105,131 | 4/1992 | Schap | 318/282 |
| 5,138,795 | 8/1992 | Compeau et al. | 49/138 |
| 5,140,316 | 8/1992 | DeLand et al. | 340/825.69 |
| 5,142,823 | 9/1992 | Brandenburg et al. | 49/118 |
| 5,155,937 | 10/1992 | Yamagishi et al. | 49/280 |
| 5,168,666 | 12/1992 | Koura et al. | 49/360 |
| 5,172,947 | 12/1992 | Schap | 292/341.16 |
| 5,189,839 | 3/1993 | DeLand et al. | 49/360 |
| 5,203,112 | 4/1993 | Yamagishi et al. | 49/280 |

(List continued on next page.)

*Primary Examiner*—Andrew C. Pike
*Attorney, Agent, or Firm*—J. Gordon Lewis

[57] ABSTRACT

A power drive system is adapted for a sliding door mounted on at least one side of a vehicle for sliding movement forwardly and rearwardly of the vehicle. The system includes a reversible motor. A bracket is guided within a guide along a fixed path between the opened and closed positions of the door. An elongated drive member is slidably disposed within the guide and connected to the bracket at one end for driving the bracket along the fixed path. A translator mechanism operably engages with the drive member for powering movement of the door. The translator mechanism can include a rotatable hub, operably engageable with the drive member, a gear transmission for driving the hub, and a clutch mechanism for connecting the motor to the transmission. The translator mechanism preferably has sufficient power to pull the sliding door into a primary latch position with respect to the corresponding portions of a latch mechanism attached to the door and frame defining the door opening. A power striker moves the door into and out of sealing engagement with the frame. A lock mechanism selectively maintains the latch in a locked position. At least one sensor provides an input signal to a control system corresponding to movement of the door, position of the lock mechanism, and position of the power striker for controlling the door drive unit, power striker drive unit, and lock mechanism drive unit in accordance with a program stored in memory.

22 Claims, 18 Drawing Sheets

U.S. PATENT DOCUMENTS

| | | | |
|---|---|---|---|
| 5,216,838 | 6/1993 | DeLand et al. | 49/280 |
| 5,233,789 | 8/1993 | Priest et al. | 49/360 |
| 5,239,779 | 8/1993 | DeLand et al. | 49/360 |
| 5,248,259 | 9/1993 | Naito et al. | 439/34 |
| 5,316,365 | 5/1994 | Kuhlman et al. | 296/155 |
| 5,319,880 | 6/1994 | Kuhlman | 49/360 |
| 5,319,881 | 6/1994 | Kuhlman | 49/360 |
| 5,323,570 | 6/1994 | Kuhlman et al. | 49/360 |
| 5,361,540 | 11/1994 | Rogers, Jr. et al. | 49/449 |
| 5,383,304 | 1/1995 | Codina Soley | 49/215 |
| 5,389,920 | 2/1995 | DeLand et al. | 340/825.69 |
| 5,582,279 | 12/1996 | Buchanan, Jr. et al. | 192/54.5 |
| 5,644,869 | 7/1997 | Buchanan, Jr. | 49/362 |
| 5,740,894 | 4/1998 | Buchanan, Jr. et al. | 192/54.5 |
| 5,755,059 | 5/1998 | Schap | 49/360 |
| 5,755,468 | 5/1998 | Buchanan, Jr. | 292/341.16 |
| 5,765,886 | 6/1998 | Buchanan, Jr. | 292/341.16 |
| 5,787,636 | 8/1998 | Buchanan, Jr. | 49/360 |

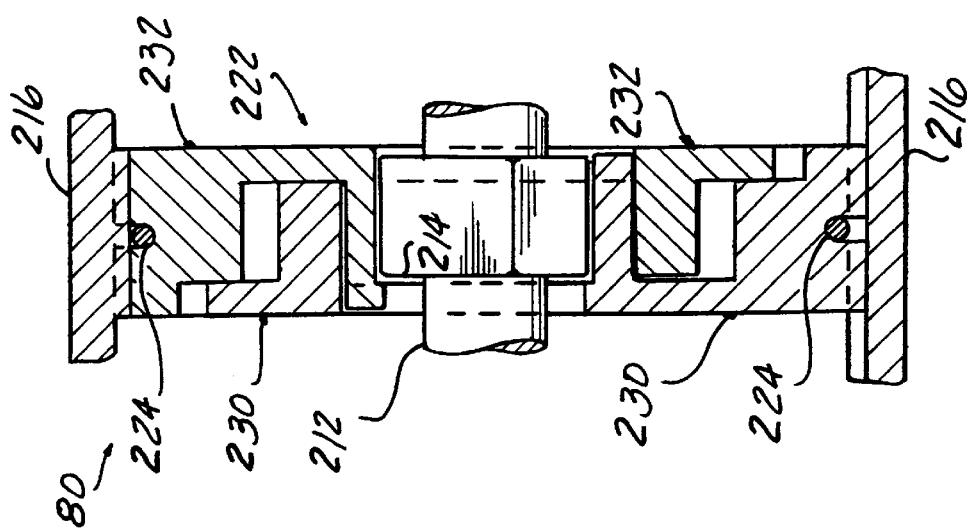
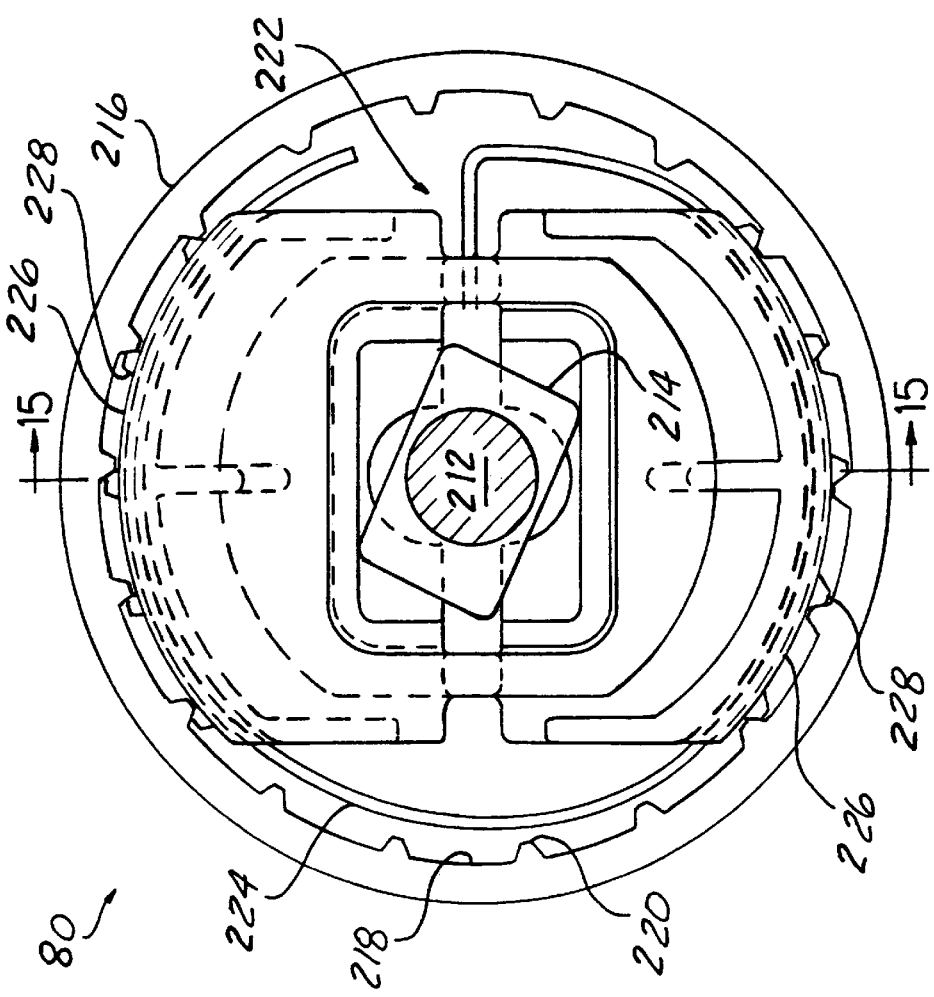

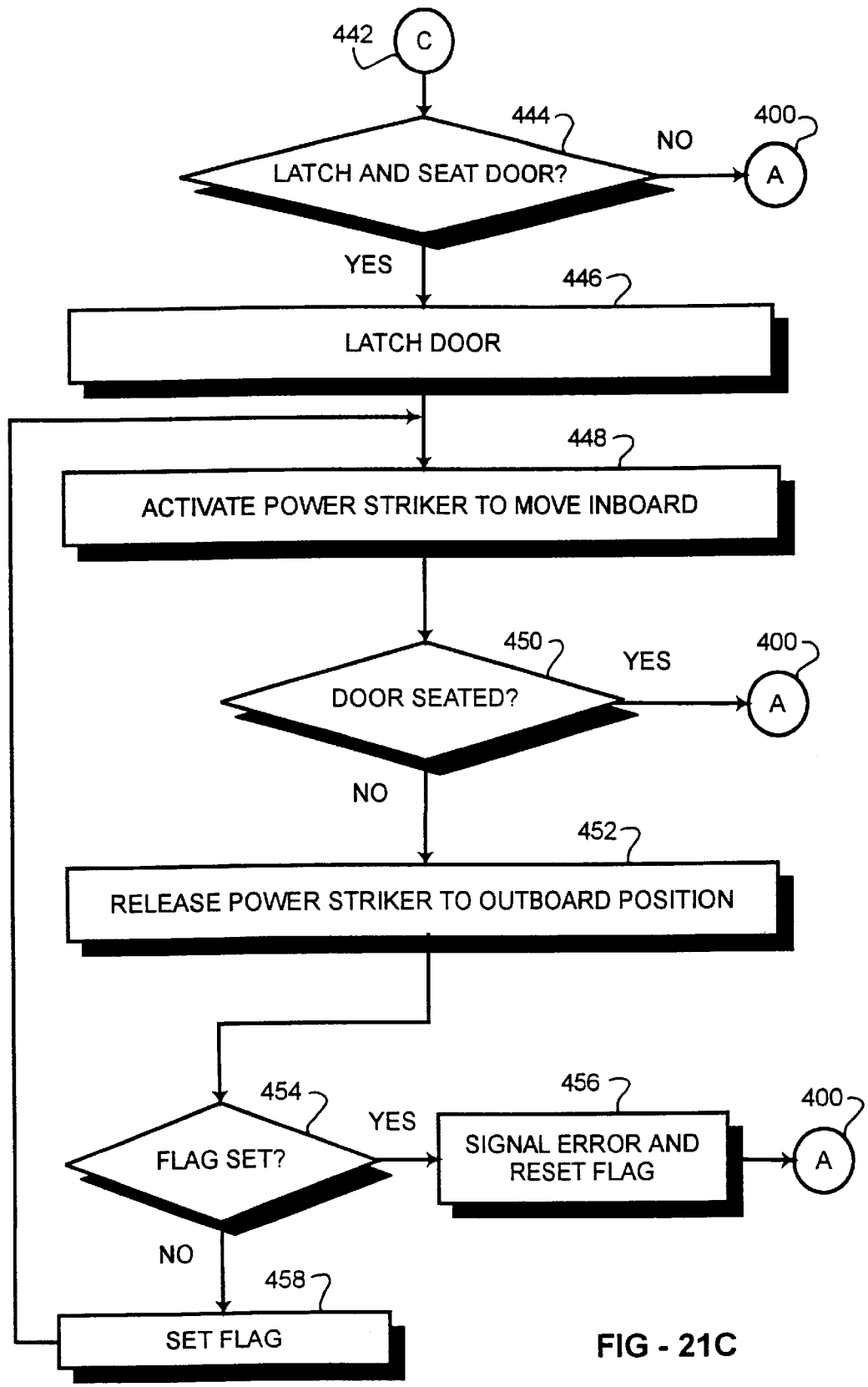

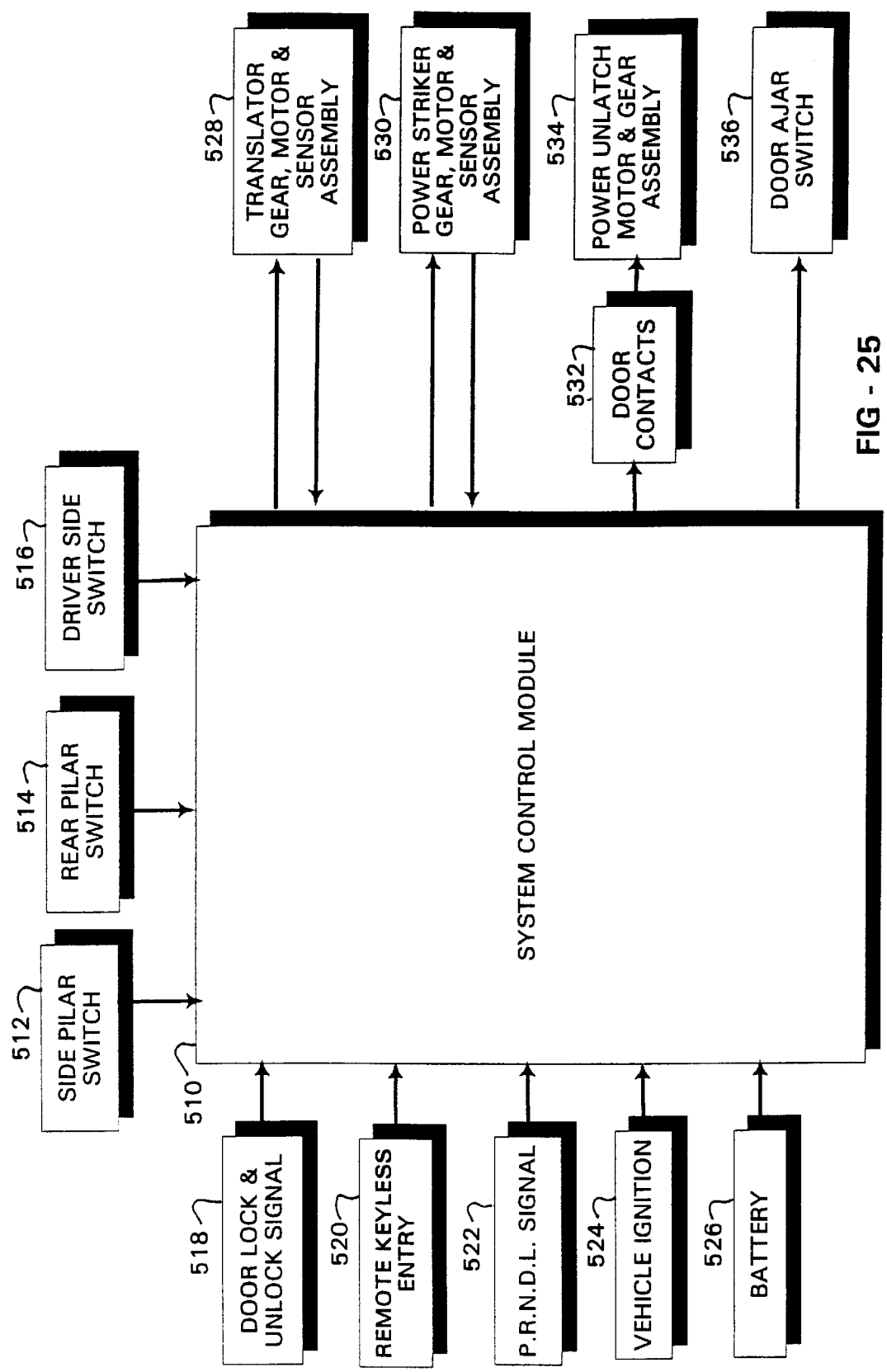

ized that sliding doors of van-type vehicles and the like may be driven in their movement along their respective guide tracks and rails by a variety of mechanical expedients, including rack and pinion drives, chain and sprocket drives, cable drives, and the like, each having various advantages and disadvantages.

ELECTRONIC CONTROL AND METHOD FOR POWER SLIDING VAN DOOR WITH REAR-CENTER-MOUNTED DRIVE

RELATED APPLICATIONS

The present application is a continuation-in-part of U.S. patent application Ser. No. 08/908,126 filed Aug. 11, 1997, now U.S. Pat. No. 5,906,071 issued May 25, 1999, which is a continuation of U.S. patent application Ser. No. 08/575,643 filed Dec. 20, 1995, now abandoned, which was a continuation-in-part of U.S. patent application Ser. No. 08/501,557 filed Jul. 12, 1995, now U.S. Pat. No. 5,582,279 issued Dec. 10, 1996.

FIELD OF THE INVENTION

The present invention relates to a control system for a power drive for moving a movable closure, such as a sliding door along a fixed path between an open position and a closed position with respect to a portal defining a passage through a barrier, and more particularly to a control system for a sliding door system accommodating manual operation and powered operation of a sliding door of a vehicle in forward and rearward movement along a fixed path between an open position and a closed position with a striker latch mechanism, where a power striker moves the sliding door from a position adjacent the closed position to a fully closed and sealed position with respect to a frame defining the opening.

BACKGROUND OF THE INVENTION

It is generally known to provide a sliding door for van-type vehicles, where the door is moved along a fixed path generally parallel to the side wall of the van for a major portion of its opening and closing movement. Typically, the sliding door of a van-type vehicle moves generally into the plane of the door opening during a portion of its respective final closing and initial opening movements, so as to be flush with the side wall when fully closed, and moves generally out of the plane of the door opening during its initial opening movement so as to be along side of, and parallel to, the side wall of the vehicle in a position generally to the rear of the door opening when fully opened.

In van-type vehicles having sliding door systems, typically upper and lower forward guide rails or tracks are attached to the top and bottom portions, respectively, of the portal defining an opening through the wall of the vehicle, and a rear guide rail is attached to the exterior of the side wall, at an elevation approximately midway between the elevation of the upper and lower forward guide rails. The respective forward end portions of the various guide rails are curved inwardly with respect to the vehicle body, and bracket and roller assemblies are fastened to the respective upper and lower forward ends of the sliding door, as well as to an intermediate position at the rear end of the sliding door. The bracket and roller assemblies are slidingly supported in the guide rails to guide the door through its opening and closing movements.

Movement of the sliding door through a major portion of the rearward track or guide rail extending generally parallel to the side wall of the vehicle requires high displacement with low force to achieve the transitional movement, since only frictional resistance and gravity resistances due to changes in grade must be overcome. The movement of the sliding door through a forward portion of the guide rail track, curved inboard with respect to the vehicle, requires a low displacement with high force. The forces associated with an elastomeric weather seal surrounding the door opening must be overcome and an unlatched striker or fork bolt on the door must be engaged by a corresponding fork bolt or striker at the rear portion of the van body door opening. During manual operation, sliding van doors are typically moved with great momentum through the entire closing movement in order to ensure full weather strip compression and latch operation at the end of such movement.

A typical standard automotive door latch assembly includes a striker, which can take the form of a pin or a U-shaped member, fixedly mounted in the door frame to project into the door opening and into the path of movement of a latch member mounted on the edge of the door, which includes the fork bolt therein. The latch member is typically movably mounted with respect to the door and arranged so that as the door approaches its closed position, the latch member will engage the striker and further closing movement of the door will move the latch member into safety latch position with respect to the pin, sometimes referred to as the secondary latch position, and further closing movement of the door will move the latch member into a primary latch position with respect to the pin, which positively retains the door against movement away from its closed position. It is generally known for at least part of the movement of the latch member into latched relationship with the striker to be resisted by a spring, and many users of sliding doors of this type habitually close the door with far greater force than necessary to overcome the spring bias. Greater force is generally required in the case of sliding doors, such as those employed in vans, where movement of the door through the final phase of movement to the fully closed position must compress a resilient door seal which extends around the entire periphery of the door opening.

Power striker devices have been proposed to overcome the high force requirements to move sliding doors into the fully closed position. Typically, the power striker devices are mounted on the door frame for powered movement between an outboard ready position with respect to the vehicle centerline where the latch is engaged with the striker and an inboard holding position where the striker holds the latch door in the fully closed position. It is still required in such systems to use high force or momentum in order to ensure that the latch engages the striker in the primary latch position prior to movement into the fully closed position. When the door is open, the striker is located in its outboard ready position. After closing translation of the door is complete, the latch on the door engages the striker and latches the door to the striker while the striker is still in the outboard position. The door may engage a limit switch on the door frame when in the outboard position to actuate a drive motor which, through appropriate mechanism, drives the striker to its inboard position, such that the latched engagement between the door and striker enables the pin to drive the door to the fully closed position. With this arrangement, a closing force sufficient to engage the latch to the primary latch position with respect to the striker needs to be applied. The powered movement of the striker provides the force necessary to compress the door seal. If the striker and latch do not reach the primary latch position with respect to one another, the powered movement of the striker from its outboard position to its inboard position would not be sufficient to bring the door to the fully closed position in sealed engagement with the frame around the periphery of the door opening. In such cases, the user may be required to reopen and close the door repeatedly until the latch and striker are disposed in the primary latch position with respect to each other when in the outboard position.

SUMMARY OF THE INVENTION

It is desirable in the present invention to provide a power drive system for moving a movable closure along a fixed path between an open position and a closed position with respect to a portal defining a passage through a barrier, such that latch bolt operation and weather strip compression can be accomplished at the end of such movement without requiring high momentum during the closing movement. It is also desirable in the present invention to provide a power drive for moving a closure with low momentum between its fully open position and fully closed position, such that the closure is moved into the primary latch position in a controlled manner without requiring additional mechanisms for engaging and moving the striker from the secondary latch position through the final portion of closing movement into the primary latch position. It is also desirable to provide a smaller power drive package for installation in a vehicle. Providing a power drive system that does not leave the drive member under load is desirable so that the drive member is not subjected to stretching forces over long periods of time and so that the need for slack take-up mechanisms is eliminated. It is further desirable to provide a power drive system with high closing force and low momentum to move the latch mechanism into the primary position with the power drive motor.

The present invention provides for automatically closing sliding doors such that the controller and motor drive translates the door along the entire fixed path during opening and closing movement to carry the fork bolt or striker on the door through the secondary latch position to the primary latch position to ensure full door security and sealing. The present invention physically pulls the door and connected striker or fork bolt into the corresponding fork bolt or striker connected to a frame defining the opening, through the secondary position and into the primary latch position, then initiates power striker motion to move the door into the weather strip seals surrounding the opening. The center rear hinge roller track is modified to accept a push/pull drive member and the translation means is coupled to the track for pushing and pulling the door open and closed. The advantage of the present invention is to pull the roller assembly and door fork bolt assembly into the power striker all the way to the primary latch position, passed the secondary position. Previously known power drive systems required high momentum to ensure proper closing of the sliding door assemblies for van-type vehicles. The power striker of the present invention then actuates a power striker to pull the door into the seals. If the translator motor has sufficient power, the latch mechanism could be fixed. The present invention provides mechanical advantage to pull the door into the primary latch position through the secondary latch position with a drive member, such as DYMETROL tape, and then uses a power striker to ensure sealing. The drive member pushes the door open during initial opening movement, which is an action that takes far less force than required to pull the door into the weather strip seals when the fork bolt and striker are in the primary latch position.

The power drive according to the present invention moves a movable closure along a fixed nonlinear path between an open position and a closed position with respect to a portal defining a passage through a barrier. Bracket means is operably connected to the movable closure. Guide means is connected to the barrier and operably engages the bracket means for guiding the bracket means along the fixed path between the open and closed positions of the movable closure. Elongated means is slidably disposed within the guide means and connected to the bracket means for driving the bracket means along the fixed path. Translator means operably engages with the elongated means for powering movement of the elongated means and the bracket means connected thereto with respect to the guide means along the fixed path.

A power striker apparatus according to the present invention includes an optionally controlled inertially activated impact cycle for engaging a striker, such as a pin or U-shaped member, with respect to a latch including a fork bolt movable from a secondary latch position to a primary latch position. The best door seals typically offer higher closing resistance, and require a large force or high momentum to close the doors. Often, a normal effort will only latch the striker in the secondary latch position, sometimes referred to as the safety latch position, even when the latching system is equipped with a power striker that allows striker engagement 12 mm to 25 mm away from the fully closed position where the door is in sealed engagement with the frame around the periphery of the door opening. The present invention provides means for snapping the spring loaded power striker into the door, when partially closed in the secondary latch position, causing the striker to move with respect to the fork bolt, such that the fork bolt moves into the primary latch position before the door can move outward from the inboard position. The power striker is then reactivated to pull the door into the fully closed inboard position in sealed engagement with the frame around the periphery of the door opening. The present invention eliminates the need for the operator to reopen and re-slam the door in order to bring the striker into the primary latch position with respect to the latch prior to operation of the power striker.

The power striker apparatus according to the present invention moves the engagement striker, such as a bolt pin or U-shaped bolt, outboard to ensure that the striker reaches the primary latch position with respect to the latch mechanism prior to the power striker being reactivated to draw the door into the fully closed and sealed position. If the striker and latch mechanism are only engaged in the secondary latch position, or safety position, normally the door must be reopened and a second attempt at closing the door must be attempted by the operator. The present invention provides means for snapping or restriking the striker member outward to quickly drive the striker into the primary latch position with respect to the door latch mechanism before the door has a chance to move outward. This method of operation could produce audible sounds, and therefore, would be activated only if the striker and latch mechanism did not achieve the primary latch position, or if the required door velocity to latch the striker into the primary latch position with respect to the latch mechanism is not normally achievable. The present invention may include a method of determining whether primary or secondary latch positions have been achieved, by monitoring the minimum amount of time required to achieve the desired position. A longer time period would be associated with reaching a primary latch position, since the force to close is higher and higher torque is required of the motor and associated gear box, slowing the motor and associated gear box, thereby requiring more time to close when in the primary latch position. In the alternative, the door ajar switch can be used as an input signal to the controller logic to determine if the door is successfully closed.

The present invention can include biasing means for preloading a striker arm clockwise towards a stop, where the striker pin will be in a first position. The biasing means, such as a spring, is reacted against a spring pin and is centered on a pivot member. Motor means is also provided for driving a worm and gear assembly which in turn drives a second worm and gear assembly. The gear portion of the second worm and gear assembly is pinned to a drive arm which carries a roller fastened thereto. When the drive arm is driven clockwise, the roller is caused to engage the roller cam, the striker arm is caused to rotate counterclockwise from the first position to a second position, where a switch means is provided for signaling a controller means for stopping the motor with the roller in a second position and the striker pin in a second position. At this point, the door system logic controller means is provided for determining if the door is closed, and if the door latch fork bolt is in the primary position. If the door latch fork bolt or striker is in the primary position, the controller means will reset and be prepared to operate the striker clockwise from the second position to the first position by rotating the drive arm counterclockwise from the second position to the first position when it is desired to open the door. This typically would be a quiet operation. If the fork bolt is determined to be in the partially latched secondary position, sometimes referred to as the safety latch position, through a separate motor, actuator, controller logic, then the drive arm is rotated clockwise beyond the second position, such that the roller rotates past the end of the cam surface and the striker arm is spring propelled to inertially snap back to the first position against the stop. The spring load and striker arm inertia must be sufficient to carry the fork bolt or striker into the primary position. The drive arm then continues clockwise until it engages the roller cam at the first position, where it is ready for another cycle to move the door into the fully closed position with the latch and pin in the primary latch position.

Other objects, advantages, and applications of the present invention will become apparent to those skilled in the art when the following description of the best mode contemplated for practicing the invention is read in conjunction with the accompanying drawings.

BRIEF DESCRIPTION OF THE DRAWINGS

The description herein makes reference to the accompanying drawings wherein like reference numerals refer to like parts throughout the several views, and wherein:

FIG. 14 is a view of the clutch according to the present invention in an engaged position with certain portions removed for clarity;

FIG. 15 is a cross-sectional view of the clutch according to the present invention in an engaged position taken along a line 15—15 as shown in FIG. 14;

FIG. 21A, 21B, and 21C are flow diagrams of a method of operating and controlling the sliding door drive unit, power striker drive unit, and lock drive unit;

FIG. 25 is an alternative simplified schematic diagram of the control system according to the present invention.

DESCRIPTION OF THE PREFERRED EMBODIMENT

Figure 1:
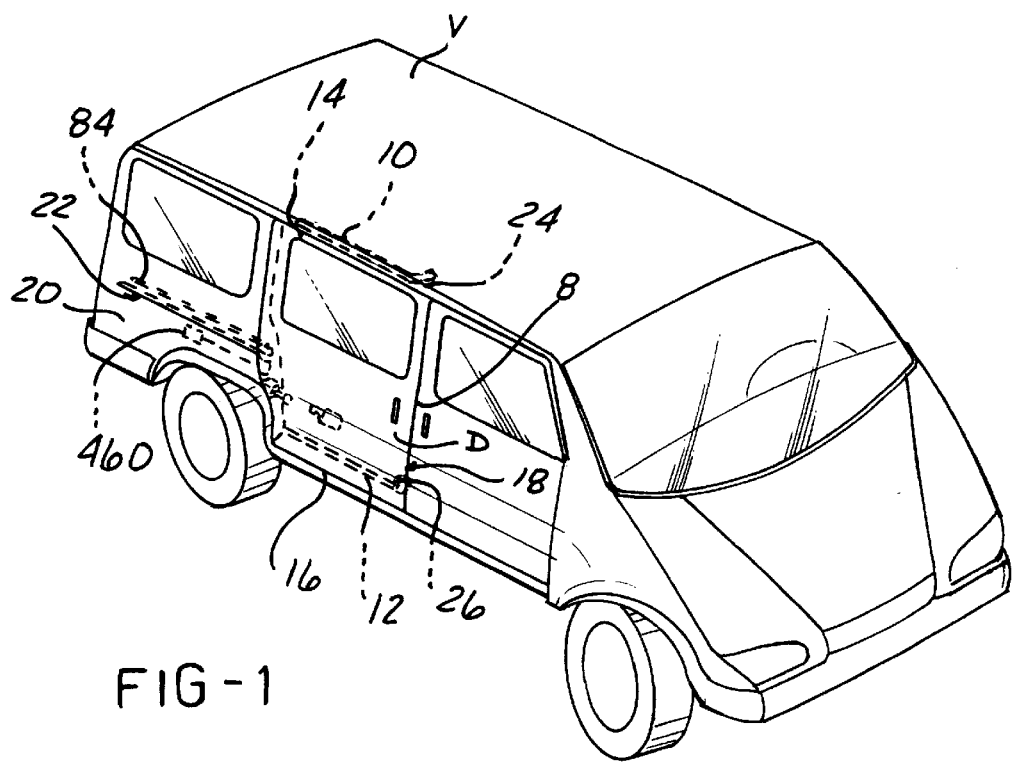
FIG. 1 is a perspective view of a movable closure disposed in a closed position with respect to a portal defining a passage through a barrier, such as a sliding door mounted on a van-type vehicle.
Figure 3:
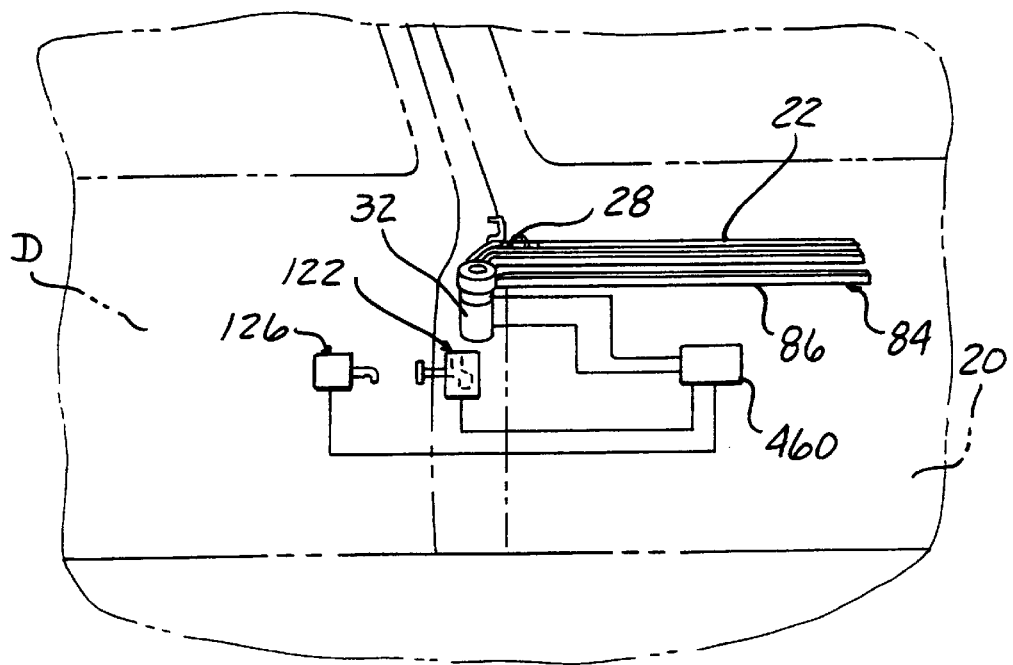
FIG. 3 is a perspective view illustrating a power drive according to the present invention mounted with respect to the van-type vehicle.

In FIGS. 1 and 3, there is shown a barrier, for example a wall of a vehicle such as a van V, having a movable closure 8, such as a sliding door D located on at least one side of the vehicle. Vans using such sliding doors have been available for years and the structural arrangements by which the door is mounted on the vehicle for manual movement between the closed position shown in FIG. 1, where the door is sealingly seated in a door opening, and an open position in which the door is disposed at the side of the van rearwardly of the door opening, is well known. In the standard arrangement, the door is latched in its closed position, typically by mechanical latches at the front and rear edges of the door, the latches being mechanically linked to a latch actuator mounted within the door to be simultaneously released by manual actuation of appropriate door handles or electronically released in response to a signal from an electronic control switch or unit. In many cases, the rear latch may include a power-driven striker mechanism which is latchingly engaged with the door as it approaches its closed position and is power driven to move the latched door to its fully closed position in compression against the seal member extending peripherally around the door opening of the vehicle.

Figure 2:
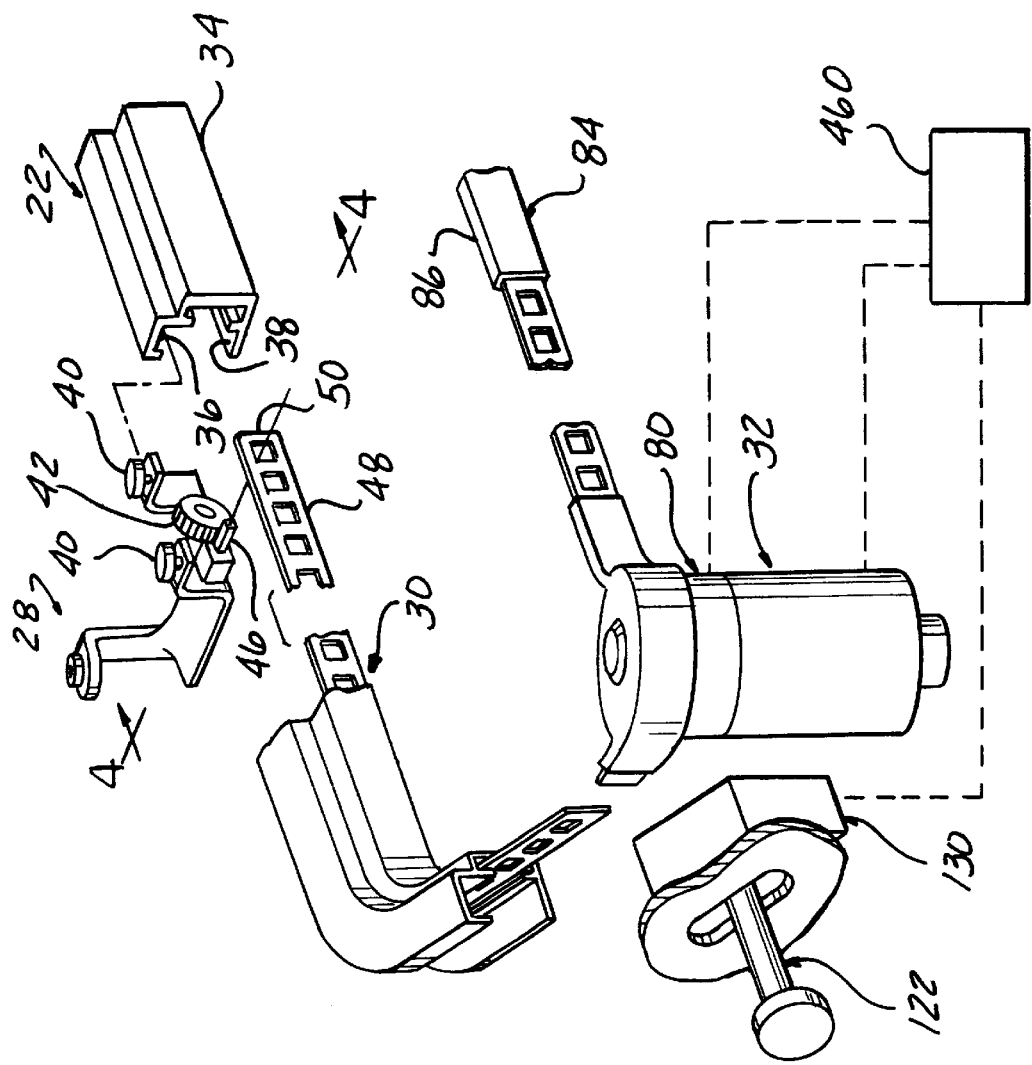
FIG. 2 is an exploded perspective view of a power drive according to the present invention for moving the movable closure.

The present invention is directed to certain components of a power drive system by means of which a movable closure, such as a sliding door, hatch, roof panel, window, or the like, can be power driven in either direction between its open and closed positions. Referring generally to FIGS. 1–3, a van-type vehicle V with at least one sliding door D typically includes upper and lower forward guide rails, tracks, or slots, 10 and 12 respectively, attached to the top and bottom portions, 14 and 16 respectively, of the portal 18 defining an opening through the barrier 20, such as a wall of the vehicle. A rear guide means 22, such as a rail, track, or slot, is attached to, or formed in, the exterior of the side wall of the vehicle at an elevation approximately midway between the elevation of the upper and lower forward guide rails 10 and 12. The respective forward end portions of the various guide means, including the upper, lower, and rear guides, curve inwardly with respect to the vehicle body. A bracket and roller assembly 24 and 26 is fastened to the respective upper and lower forward ends of the sliding door D. Bracket means 28 is operably connected to the movable closure adjacent a rear edge generally midway between the first and second edges. The bracket and roller assemblies 24 and 26, and the bracket means 28, are slidingly supported in the corresponding guide rails 10 and 12 and guide means 22 to guide the movable closure through opening and closing movements with respect to the barrier. The guide means 22 is connected to the barrier generally midway between the first and second guide tracks, 10 and 12 respectively, and operably engages the bracket means 28 for guiding the bracket means 28 along the fixed nonlinear path between the opened and closed positions of the movable closure. Elongated means 30 is slidably disposed within the guide means 22 and connected to the bracket means 28 for driving the bracket means 28 along the fixed path. Translator means 32 is operably engageable with the elongated means 30 for powering movement of the elongated means 30 and connected bracket means 28 with respect to the guide means 22 along the fixed path, the translator means being disposed adjacent an edge of the frame for the opening generally midway between the first guide track 10 and the second guide track 12.

Figure 4:
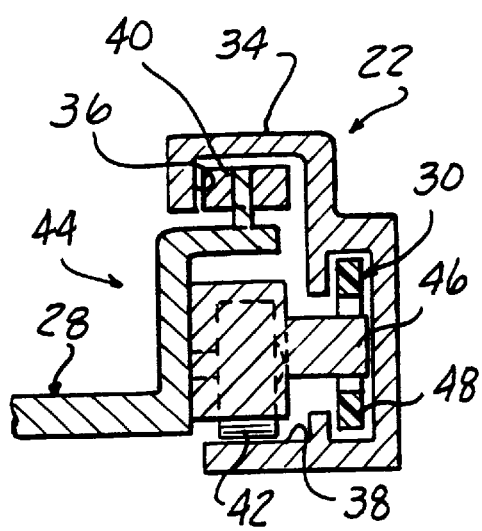
FIG. 4 is a detail cross-sectional view of guide means for guiding bracket means connected to the movable closure taken along line 4—4 as shown in FIG. 2.
Figure 5:
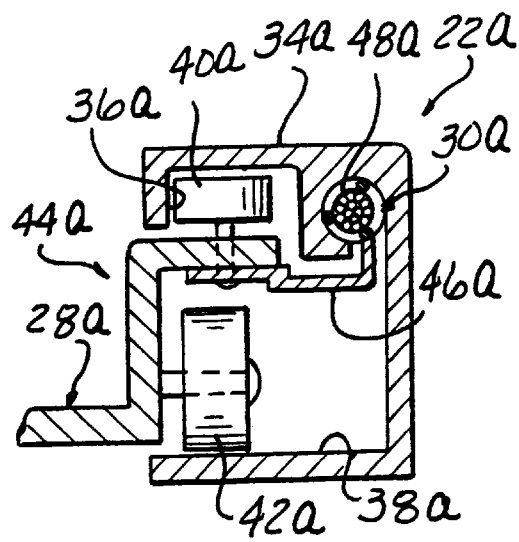
FIG. 5 is a cross-sectional view similar to that of FIG. 4 of an alternative configuration of the guide means for guiding the bracket means connected to the removable closure taken along a line similar to line 4—4 as shown in FIG. 2.
Figure 6:
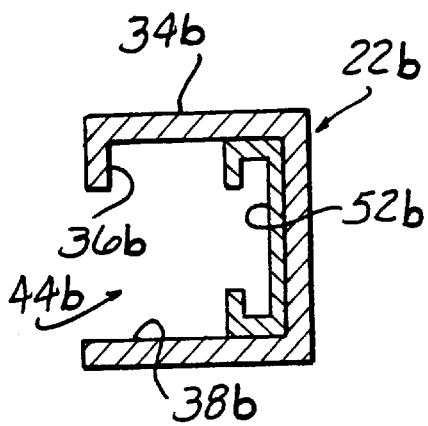
FIG. 6 is a cross-sectional detailed view of an alternative construction of the guide track illustrated in FIG. 4.
Figure 7:
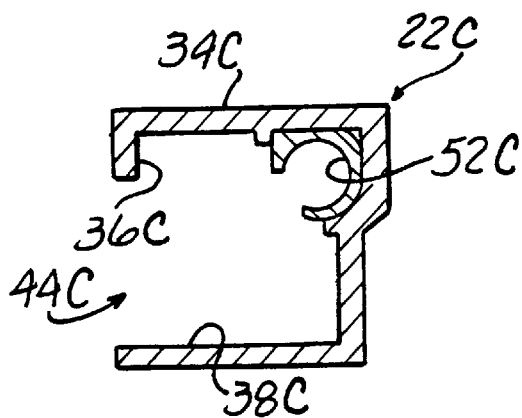
FIG. 7 is a cross-sectional detailed view of an alternative construction for the guide track illustrated in FIG. 5.
Figure 10:
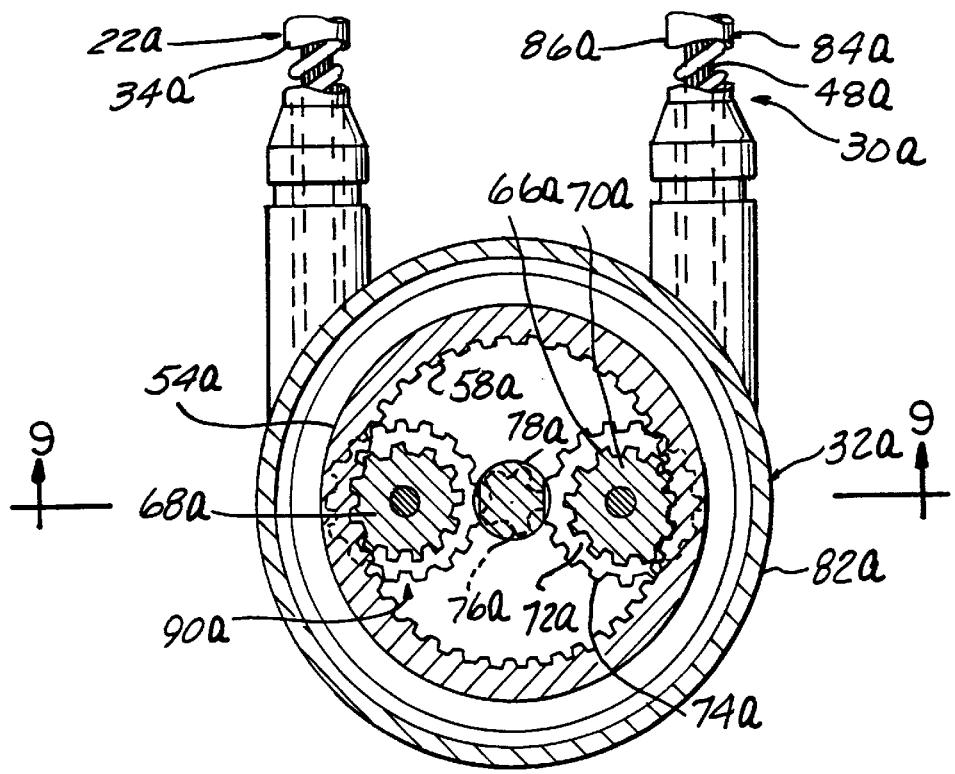
FIG. 10 is a cross-sectional plan view of the translator means taken along a line 10—10 illustrated in FIG. 9.

For FIGS. 1–11, alternative embodiments are designated with the same base numeral followed by an alphabetic designation "a", "b", or "c" for purposes of clarity, but only the base reference numeral will be used hereinafter for simplicity since the following description is generally generic to all embodiments, except as noted. As best seen in FIGS. 2 and 4–7, the rear guide means 22 includes an elongated track or housing 34. The elongated track or housing 34 typically defines at least two surfaces 36 and 38 disposed at an angle with respect to one another engageable with rollers 40 and 42 respectively. The rollers 40 and 42 typically have axes of rotation that are disposed at an angle with respect to one another, generally corresponding to a 90° angle as illustrated in FIGS. 4 and 5. In the illustrated embodiments of FIGS. 4–7, the guide means 22 defines a slot 44 of sufficient dimension to permit the bracket means 28 to extend therethrough. The housing 34 generally defines a first chamber for receiving the rollers 40 and 42, and a second chamber for slidably receiving the elongated means 30. The first and second chambers are in communication with one another longitudinally along the length of the housing 34 allowing attachment of the bracket means 28 to the elongated means 30 or 30a, such as by coupling member 46 or 46a. The elongated means 30 may include a tape-like drive member 48 as illustrated in FIGS. 2 and 4. The tape-like drive member 48 is commercially available under the trade name DYMETROL. The elongated means 30 or 30a is slidably guided within the second chamber of the housing 34 to move the bracket means 28 with respect to the guide means 22. The elongated means 30 or 30a can include an elongated drive member having first and second ends, where the first end 50 is connected to the bracket means 28 by coupling member 46 or 46a. The elongated means 30 or 30a operably engages with the translator means 32 to pull the bracket means 28 along the guide means 22 from the open position to the closed position. The translator means 32 can be reversed to push the elongated means 30 or 30a and connected bracket means 28 with respect to the guide means 22 in order to move the movable closure from the closed position to the open position. This provides a push/pull drive member and thereby reduces or eliminates the problems associated with previously known pull/pull cable systems used to power sliding doors on van-type vehicles. The elongated means 30a can also be in the form of a push/pull helically wound cable-like drive member 48a as illustrated in FIGS. 5, 9, and 10. As previously described, the cable-like drive member 48a is slidably received within the second chamber defined by the housing 34a, and connected to the bracket means 28a by coupling member 46a. The helically wound cable-like drive member 48a operably engages the translator means 32a in order to pull the movable closure from the open position into the closed position. The helically wound, cable-like drive member 48a can be pushed by the translator means 32a within the second chamber of the housing 34a in order to drive the bracket means 28a along the guide means 22a from the closed position to the open position. The cable-like drive member 48a is commercially available under trade names, such as TELEFLEX, HILEX, or SUHNER cable. The housing 34 may be formed as a single piece, such as by extrusion, injection molding, or metal forming, or in the alternative may be constructed of a plurality of individual pieces assembled into a track 34 having a first chamber for receiving the rollers 40 and 42 and a second chamber for receiving the drive member 48 or 48a. In the preferred configuration, the first chamber of the housing 34 is disposed adjacent to the slot 44 and the second chamber for slidably receiving the drive member 48 or 48a is disposed spaced from the slot 44. As best seen in FIGS. 6 and 7, the portion of the housing 34b, 34c forming the second chamber for slidably receiving the drive member may be formed of a separate track or channel 52b, 52c connected with respect to the housing 34b, 34c. Referring now to FIGS. 4–7, various embodiments of: guide means 22, 22a, 22b, 22c; bracket means 28, 28a; elongated means 30, 30a; elongated track or housing 34, 34a, 34b, 34c; at least two surfaces 36, 38, 36a, 38a, 36b, 38b, 36c, 38c; rollers 40, 42, 40a, 42a; slot 44, 44a, 44b, 44c; coupling member 46, 46a; drive member 48, 48a; and separate track or channel 52b, 52c are illustrated.

Figure 8:
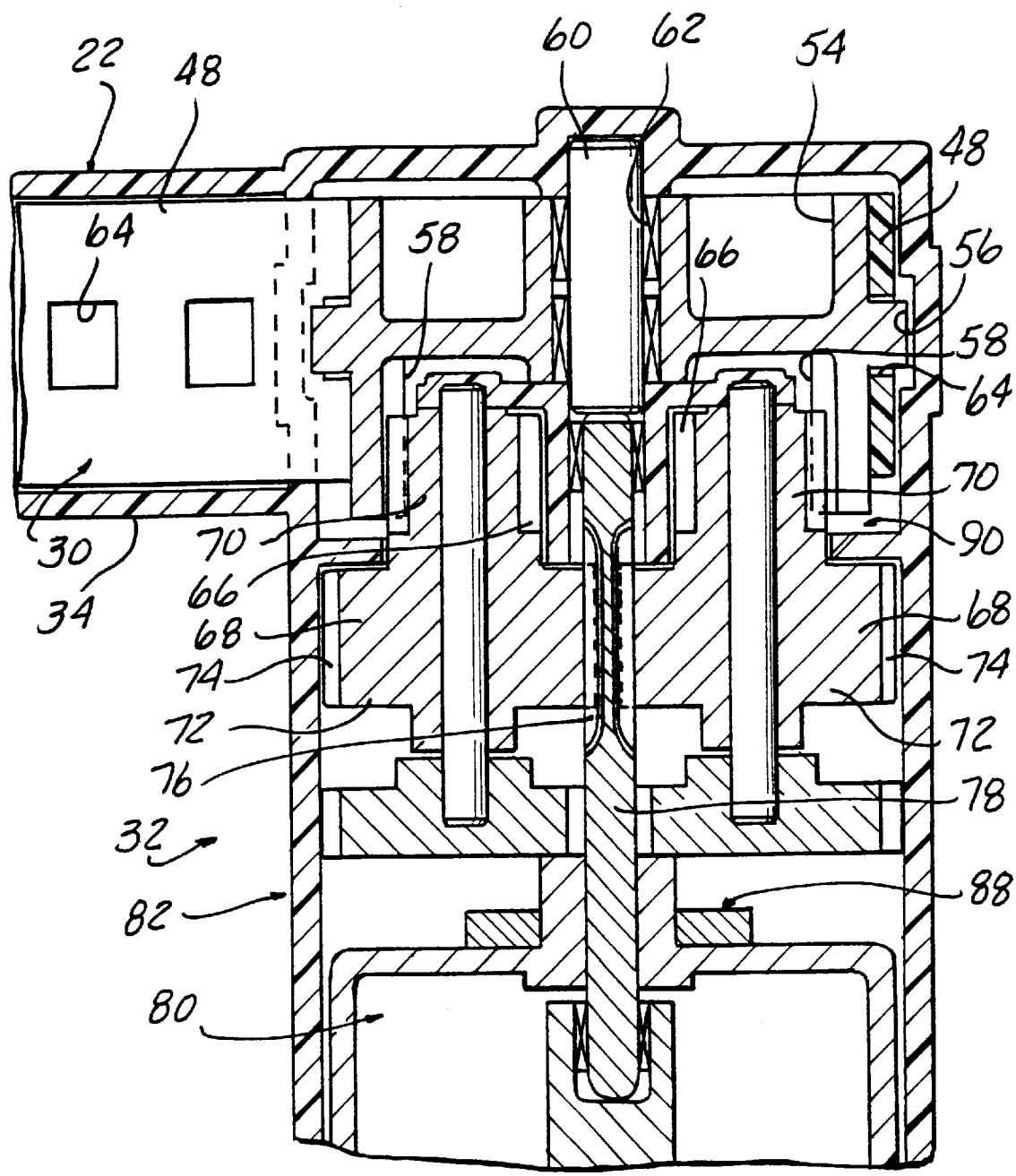
FIG. 8 is a partial cross-sectional view of translator means according to the present invention for powering movement of the movable closure with push/pull tape-type drive member taken along a line similar to line 9—9 as shown in FIG. 10.
Figure 9:
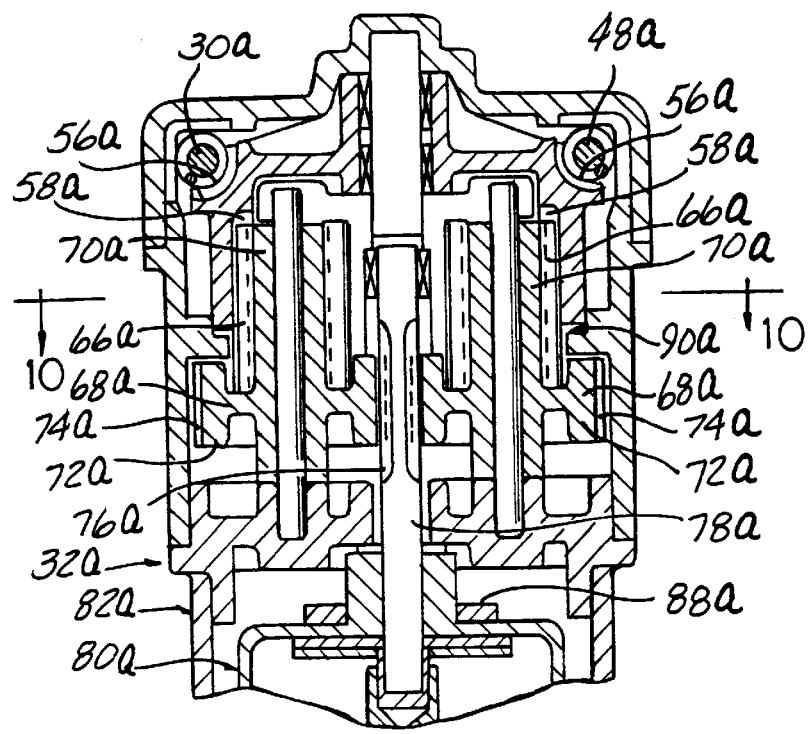
FIG. 9 is a partial cross-sectional view of an alternative configuration of translator means according to the present invention for powering movement of the closure means with a helically wound push/pull cable-type drive member taken along a line 9—9 as shown in FIG. 10.

Referring now to FIG. 8, the translator means 32 includes a rotatable hub 54 having drive member engaging protrusions 56 on an external surface and a plurality of gear teeth 58 formed on an internal periphery. The hub 54 is rotatably connected to a first shaft 60 by bearings 62. In FIG. 8, the drive member 48 is illustrated in a tape-like form having a plurality of apertures 64 formed therein spaced longitudinally from one another, and adapted to receive the drive member engaging protrusions 56 formed on the hub 54. The plurality of first gear teeth 58 intermeshingly engage with a plurality of second gear teeth 66 formed on at least one intermediate gear 68. Each intermediate gear 68 is rotatable about an axis of rotation. As illustrated in FIG. 8, the axis of rotation of each intermediate gear 68 is offset from the axis of rotation of the hub 54. Each intermediate gear 68 includes a reduced diameter portion 70 supporting the plurality of second gear teeth 66 on an external periphery thereof, and an enlarged diameter portion 72 having a plurality of third gear teeth 74 supported on an external periphery thereof. The third gear teeth 74 intermeshingly engage with a plurality of fourth gear teeth 76 connected to or formed on a second shaft or pinion 78. The plurality of first, second, third, and fourth gear teeth 58, 66, 74, and 76 respectively, including hub 54, intermediate gear 68, and pinion 78, define gear means 90 for transmitting rotary motion from the clutch means 80 into linear movement of the drive member 48 along the guide means 22 in either direction to impart opening and closing movement to the closure member. The pinion 78 is connected to clutch means 80 for driving the pinion 78 in rotation about a rotatable axis. As illustrated in FIG. 8, the rotatable axis of the pinion 78 is coaxial with the rotatable axis of the hub 54. The clutch means 80 is driven in rotation by a motor, not shown in FIG. 8. Housing means 82 encloses the hub 54, intermediate gear 68, and clutch means 80.

While useful in other applications, the power drive system of the present invention is especially well adapted for use in operating the sliding door of a van-type vehicle. All power drive systems for sliding doors require a power system capable of driving an output member coupled to the door in either direction over a relatively long working stroke. In van-type vehicle applications of the power drive system, the sliding door is conventionally mounted at the passenger side of the van, but may also or alternatively be mounted on the driver's side, and a major convenience of the system is that it may be power operated by control switches accessible from the driver's seat. However, if the driver is outside the van loading or unloading articles through the sliding door, the power controls are out of reach, and there are many occasions where in this situation the driver will want to open or close the door manually. Additionally, there may be situations where it is desirable to override the speed of the door closing to manually close the sliding door faster than provided by the power drive system. If the door is positively mechanically linked to the power source of the drive, this connection will interfere with manual operation of the door. Therefore, it is desirable in the present invention to provide a clutch with override capability. Further, it is desirable in the present invention to normally maintain the clutch in a disengaged position. In addition, it is desirable in the present invention to cause the clutch to engage in response to acceleration of the power drive for the system.

The clutch according to the present invention uses centrifugal forces to disengage at high rotational speeds. Also, Coriolis acceleration component forces may be used in the clutch of the present invention to assist in camming the clutch out of engagement, or into engagement. The present invention allows a motorized power drive system to be manually disengaged and manually overridden without harming the driving mechanism.

According to the clutch of the present invention, a shaft driver or spindle engages a drum or cup driven through first and second clutch plates or shoes. The rapid acceleration of the motor spindle causes the first and second clutch plates to radially extend or expand to engage the drum. The present invention locates the respective center of gravities of the first and second clutch plates so that centrifugal force does not encourage coupling of the clutch. In fact, if the clutch is ever overridden, the contact force between the clutch plate and cup force tends to zero causing the clutch to disengage. Additional mass or counterweights are provided in each clutch plate to ensure that the center of gravity of the clutch plate is less than the clutch plate throw or very close to zero when in a running condition. As force is applied by the spindle, the force overcomes the clutch plate inertia propelling the clutch plate radially outward as it rotates to contact the drum. The shaft of the motor only rotates, while the clutch plates simultaneously rotate and move radially outward. As the rotational speed increases, so does the centrifugal force, causing the contact force to decrease. Eventually the contact force goes to zero and the clutch is in effect disengaged. At this point, without other controls, the motor will accelerate to its free speed. The clutch should be designed such that this speed is high enough to "reset" the device to its initial configuration. The clutch according to the present invention disengages when an overrun is attempted, where an overrun is generally defined as a rotational speed approximately greater than the free motor speed or limiting/critical clutch disengagement speed.

In the clutch of the present invention, a driver is attached to an output shaft of a motor. Clutch plates or shoes are initially resting against the driver by virtue of preloading by a spring (or springs). The present invention requires that the driver and shoes move relative to one another during startup, clutch engagement, and overrun. Since the shoes are counterweighted such that the tendency of each shoe is to clamp against the driver as the angular speed is increased, the relative motion between the driver and the shoes must be initiated immediately at startup. The present invention requires the spring load that exists at startup and when the driver and shoes move together to be determined; and once this is known, the spring preload can be selected such that the desired relative motion between the driver and the shoes will occur. The clutch according to the present invention is evaluated as having two degrees of freedom.

Referring now to FIGS. 12–15, the clutch 80 according to the present invention includes a driven shaft or spindle 212 having a driver block 214 connected thereto. The spindle 212 is disposed within a rotatable cup or drum 216. The drum 216 may have a smooth interior surface 218, or can be formed with radially inwardly extending lugs, serations, or teeth 220.

Means 222 is disposed radially between the spindle 212 and the drum 216 for moving radially with respect to the axis of rotation of the spindle between an engaged position and a disengaged position with respect to the drum 216. The moving means 222 is responsive to acceleration of the spindle 212 for moving into the engaged position, and is responsive to high rotational speed for moving into the disengaged position when the clutch is unloaded, i.e., when the door is manually overdriven. Biasing means 224 normally maintains the moving means 222 in the disengaged position when the spindle 212 is at rest. The moving means 222 preferably includes a radially expandable rim surface 226, sometimes referred to herein as an engagement surface or clutch surface, for engaging the interior surface 218 of the drum 216. The rim surface 226 may define a friction clutch surface for engaging the surface 218 of drum 216. The moving means 222 can alternatively include a positive engagement rim surface 226 having at least one radially extending lug, or a plurality of preferably spaced radially extending teeth 228 for engagement with the radially inwardly extending lugs or teeth 220 on the interior surface 218 of the drum 216.

The moving means 222 preferably includes at least one counterweighted shoe 230, and more preferably first and second counterweighted shoes 230 and 232, respectively, for collapsing radially inwardly against the driver block 214 of the spindle 212 in response to increased angular or rotational speed beyond a predetermined value. The predetermined value of angular or rotational speed generally corresponds to a rotational speed greater than a free motor speed of the spindle 212. In addition, the moving means 222 is weighted for moving radially outwardly into the engaged position in response to rapid angular acceleration, while also being counterweighted for moving radially inwardly into the disengaged position in response to high rotational speeds when the clutch is unloaded, i.e., when the door is manually overdriven. By way of example and not limitation, the spindle according to the present invention is capable of a fast start or rapid angular acceleration, in the range of approximately 18,000 radians per second squared (radians\sec$^2$). Also by way of example and not limitation, the free-wheeling speed of the spindle 212 according to the present invention is in the range of approximately 3,600 to 4,000 revolutions per minute.

The moving means 222 preferably includes an engagement surface or rim 226 for contact with the drum 216 and a center of gravity, such that the axis of rotation of the spindle 212 is interposed diametrically between the engagement surface 226 and the center of gravity. In operation, the moving means 222 defines a clutch surface, such as a rim surface 226, that disengages from the drum 216 in response to centrifugal force acting on the center of gravity during overload or overrun conditions. In other words, the moving means 222 is operable such that the clutch surface 226 is responsive to centrifugal force and Coriolis force, created by radial acceleration of the center of gravity diametrically opposed to the clutch surface 226, to release the clutch surface 226 from engagement with the interior surface 218 of the drum 216.

Referring now to FIGS. 12 through 15, the moving means 222 preferably includes first and second counterweighted shoes, 230 and 232 respectively. Each shoe includes an engagement surface, sometimes referred to herein as a clutch surface or rim surface 226. A spring groove is formed in the face of the rim surface 226 for receiving and allowing passage of the biasing means 224. Axially extending wall means define a driver block receiving pocket for operably engaging the driver block 214 connected to the spindle 212 for transferring torque and rotary motion from the spindle 212 through the first and second shoes, 230 and 232 respectively, to the rotatable drum 216. The pocket is oversized, and preferably complementary in shape to the driver block 214 sufficiently to allow limited relative rotation between the driver block 214 and the pockets defined in each of the first and second shoes, 230 and 232 respectively. The pockets may further be defined by a radially extending wall having an arcuate cutout allowing passage of the spindle 212 therethrough. The wall means interacts with driver block 214 to cammingly urge the first and second shoes 230 and 232 radially outwardly in diametrically opposite directions in response to rapid acceleration of the spindle 212 during startup, thereby engaging the rim surface 226 with the interior surface 218 of the rotatable drum 216 for transmitting torque and rotary motion from the spindle 212 to the drum 216. Each counterweighted shoe 230 and 232 includes a counterweight disposed diametrically opposite from the rim surface 226. The counterweights are of sufficient size and density to shift the center of gravity to a position diametrically opposite from the rim surface 226, so that centrifugal force created by high rotational speed acting on the counterweight causes the rim surface 226 to move radially inwardly, and to disengage from the interior surface 218 of the drum 216. The center of gravity is disposed on the opposite side of the rotational axis of the spindle 212 from rim surface 226, so that the rotational axis of the spindle 212 is interposed between the center of gravity and the rim surface 226 for each of the first and second shoes, 230 and 232 respectively.

Guide means is formed on each of the first and second shoes, 230 and 232 respectively, in order to guide the relative movement of the first and second shoes with respect to one another along a radially extending diameter extending from the axis of rotation of the spindle 212 and generally bisecting the peripheral arc of the rim surface 226 on each of the first and second shoes, 230 and 232 respectively. Each of the first and second shoes, 230 and 232 respectively, is formed with a counterweight receiving pocket for receiving the counterweight of the other shoe. The pocket allows relative radial movement between the first and second shoes as best seen by comparing the disengaged position illustrated in the cross-sectional view of FIG. 13 with the engaged position illustrated in the cross-sectional view of FIG. 15. Each counterweight is connected to the remaining portion of the shoe by at least one, and preferably two, arms extending from the counterweight to the counterweight receiving pocket of the shoe. The counterweight receiving pocket has an alignment rib extending radially inwardly therein. A rib receiving groove or aperture is formed in the counterweight of the other shoe. When the first and second counterweighted shoes, 230 and 232 respectively, are disposed in overlaying, overlapping relationship to one another, the counterweight of the first shoe 230 is received within the counterweight-receiving pocket of the second shoe 232 with the alignment rib of the second shoe 232 slidably received within the aperture of the first shoe 230, while the counterweight of the second shoe 232 is received within the counterweight receiving pocket with the alignment rib of the first shoe 230 slidably received within the aperture of the second shoe 232. In addition, the arms of the first and second shoes slidingly engage along the external surface of the wall means. The guide means is defined by the interaction of arms with external surfaces and alignment rib with aperture of each of the first and second shoes, 230 and 232 respectively.

The clutch selectively transmits torque and rotary motion from a spindle having an axis of rotation to a drum. First and second shoe members disposed radially between the spindle and the drum move radially with respect to the axis of rotation between an engaged position and a disengaged position with respect to the drum. The first and second shoe members are responsive to acceleration for moving into the engaged position and responsive to rotational speed for moving into the disengaged position when the clutch is unloaded, i.e., when the door is manually overdriven. A biasing spring normally maintains the first and second shoe members in the disengaged position when the spindle is at rest.

A more detailed description of the clutch means 80, by way of example and not limitation, is disclosed and illustrated in U.S. Pat. No. 5,582,279 issued Dec. 10, 1996, for "Acceleration Reaction Clutch With Override Capability", which is incorporated by reference herein.

According to the present invention, the barrier is a construction forming an extended indefinite surface preventing or inhibiting the passage of persons or things, and can include a wall, ceiling, roof, or cover for a stationary structure or a movable vehicle, such as the van V. The portal is structure defining an opening through the barrier for passage of persons or things, such as the framing of a door, window, hatch, or roof panel opening. The movable closure is an obstructive structure whose presence in or before a passage bars traffic through the passage and is mounted to move in a regular, repetitive, predetermined path with respect to the portal so as to alternately open or close the passage, and can take the form of a hatch, a sliding window, a roof panel, or a sliding door D. Clutch means 80 provides for overrunning with respect to the intermediate gear 68 in response to manual manipulation of the movable closure, or for slipping in response to the movable closure contacting an obstruction prior to reaching the opened or closed positions.

The housing means 82 is connected to the guide track 34 for feeding the drive member 48 or 48a into operable engagement with the hub 54 or 54a, and dispenses the drive member 48 or 48a into storage means 84, shown in FIGS. 2 and 3, for storing the portion of the drive member 48 or 48a driven through the hub 54 or 54a. The storage means 84 may include a storage track 86 as best seen in FIGS. 2 and 3. It should be recognized that the location of the translator means 32 can be moved from that shown in FIGS. 1–3. The location of the translator means 32 can be moved by providing an appropriate length of drive member guide means 22 between the closed position and the translator means 32, and by adding an appropriate amount of spent drive member storage means 84 to accommodate the longer length of the drive member 48.

The door drive system according to the present invention uses a push/pull drive member 48 or 48a connected at one end to the movable closure, such as the door D, and guided in longitudinal movement within a guide track 34 which extends parallel to the path of movement of the door at a position generally midway between the upper and lower edges of the portal or door opening. The drive member 48 or 48a is driven in longitudinal movement by a reversible electric motor controlled by an electronic control unit in a manner such that the door may be automatically stopped in response to sensing of an overload, such as the jamming of an object between the closing door and the door frame, or providing for express operation and cancellation. The employment of an electronic control unit enables the power drive for the door to be operated in a safe and efficient manner, as by providing the door with an antipinch capability by automatically stopping the drive if an object becomes trapped between the closing door and the door frame, providing for express operation and eliminating the need for limit switches to sense specific door positions. Electronic control units capable of being programmed to perform these, and similar functions, are well known and commercially available from a variety of sources.

Position sensing means 88 or 88a can be provided on the clutch means 80 or 80a for signaling the location of the sliding door D during manual and powered movement. Sensing means 88 or 88a is responsive to rotary movement of the clutch means 80 or 80a for transmitting to the electronic control unit a signal representative of the location of the door along the fixed path. The sensing means 88 or 88a can include a magnet connected to the clutch means 80 or 80a for rotation therewith and a magnetic sensor connected to the housing means 82 for sensing the position of the magnet as it passes by the sensor during rotation for transmitting to the electronic control unit a signal representative of the location of the door allowing the fixed path of travel between the open and closed positions during manual and powered operations.

Referring now to FIGS. 9 and 10, an alternative configuration of the translator means 32a is illustrated for use with a drive member 48a having a helically wound cable-like form. The previous description with respect to the translator means 32 illustrated in FIG. 8 and clutch means 80 illustrated in FIGS. 12–15 is equally applicable to the description of FIGS. 9 and 10 and structure has been labeled with like reference numerals to refer to like parts throughout the several views of FIGS. 8–10 with the addition of alphabetic designation "a" after the numerals of FIGS. 9–10 to designate the alternative embodiment for purposes of clarity. Referring now to FIGS. 9 and 10, an alternative embodiment of: guide means 22a; elongated means 30a; translator means 32a; elongated track or housing 34a; drive member 48a; hub 54a; drive-member-engaging protrusions 56a; gear teeth 58a; second gear teeth 66a; intermediate gear 68a; reduced diameter portion 70a; enlarged diameter portion 72a; third gear teeth 74a; fourth gear teeth 76a; second shaft or pinion 78a; clutch means 80a; housing means 82a; drive member storage means 84a; storage track 86a; position sensing means 88a; and gear means 90a are illustrated. In the translator means 32a illustrated in FIGS. 9 and 10, the drive member engaging protrusions 56a take an arcuate form in order to operably engage with at least one wire-like member helically wound in uniformly spaced turns around the core of the push/pull cable. The wire-like member or members are preferably disposed over an entire longitudinal length of the core to form a flexible screw-like member having an exterior helical gear tooth or thread defining a single lead, double lead, triple lead, or other multiple leads as desired for the particular application. The wire-like member or members can be heat treated to embed the cables in the stranded internal wire cable used as the flexible core as is conventional. A 13° lead is preferable with a lead angle in a range of between 5° and 70° inclusive. In all other respects, the translator means 32a and clutch means 80a of FIGS. 9 and 10 operates in the same manner as previously described with respect to FIG. 8 and FIGS. 12–15.

During powered operations, the motor (not shown) drives the clutch means 80 or 80a in either rotational direction. The clutch means 80 or 80a transmits rotational motion through gear means 90 or 90a to the rotatable hub 54 or 54a. The drive member engaging protrusions 56 or 56a formed on the rotatable hub 54 or 54a engage the drive member 48 or 48a to move the drive member 48 or 48a longitudinally in either direction corresponding to the rotational direction of the reversible motor. When opening the movable closure, initially the latch mechanism is released as is conventional, and the motor is rotated in a first direction to push the elongated means 30 or 30a and bracket means 28 or 28a with sufficient force to release the movable closure from the seals extending around the periphery of the portal, in cooperation with simultaneously resetting a power striker to its initial position. The closure member is then driven by the elongated means 30 or 30a through bracket means 28 or 28a along rear guide means 22 or 22a until reaching the fully open position as indicated by position sensor means 88 or 88a. The motor is then deenergized, and the door is held in an open position by detent means as is conventional. During powered closing operations, the motor is energized in the reverse direction pulling the elongated means 30 or 30a and connected bracket means 28 or 28a along the rear guide means 22 or 22a from the open position to the closed position. The motor has sufficient power to overcome the detent means holding the movable closure in the open position, and also has sufficient power to pull the movable closure through the curved portion of the guide tracks adjacent the closed position moving the striker and fork bolt of the latch mechanism all the way through the secondary position (shown schematically in phantom lines at 326 and 322 in FIG. 11) to the primary latch position (shown schematically in phantom lines at 326a in FIG. 11). The power striker is then actuated in order to move the sliding door into the seal extending around the periphery of the portal into a sealed and final closed position (shown schematically in solid lines at 326b in FIG. 11). During manual opening or closing movement, the movable closure is moved in the desired direction and at the desired speed with the clutch means 80 or 80a disengaged from the drive motor. The motion of the clutch means 80 or 80a in response to manual movement continues to provide an appropriate signal through sensing means 88 or 88a to indicate the position of the movable closure to the electronic control unit.

Figure 11:
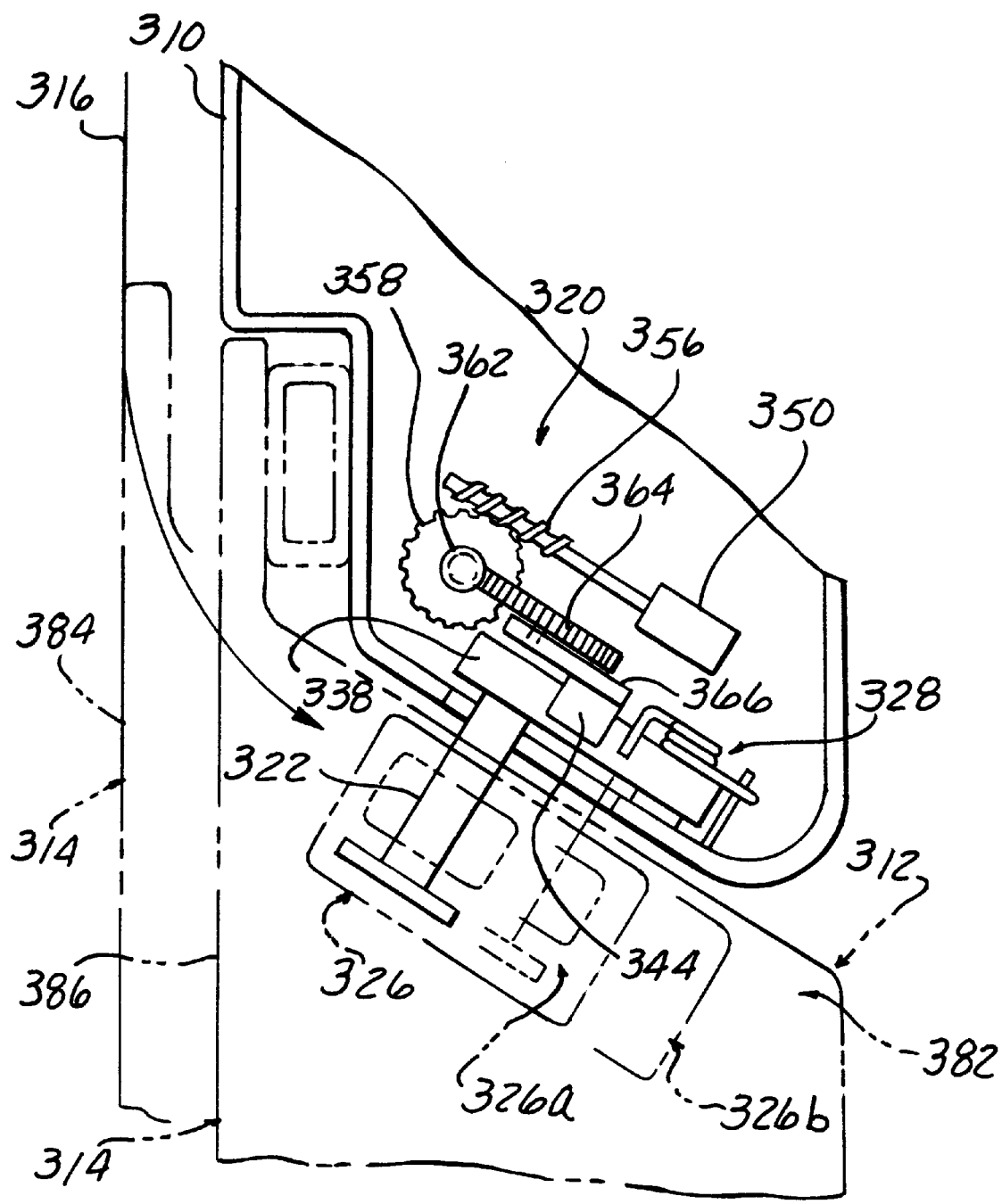
FIG. 11 is a simplified cross-sectional view of a power striker apparatus connected to a portal through a barrier, such as the door frame of a vehicle for a sliding door latch assembly.
Figure 13:
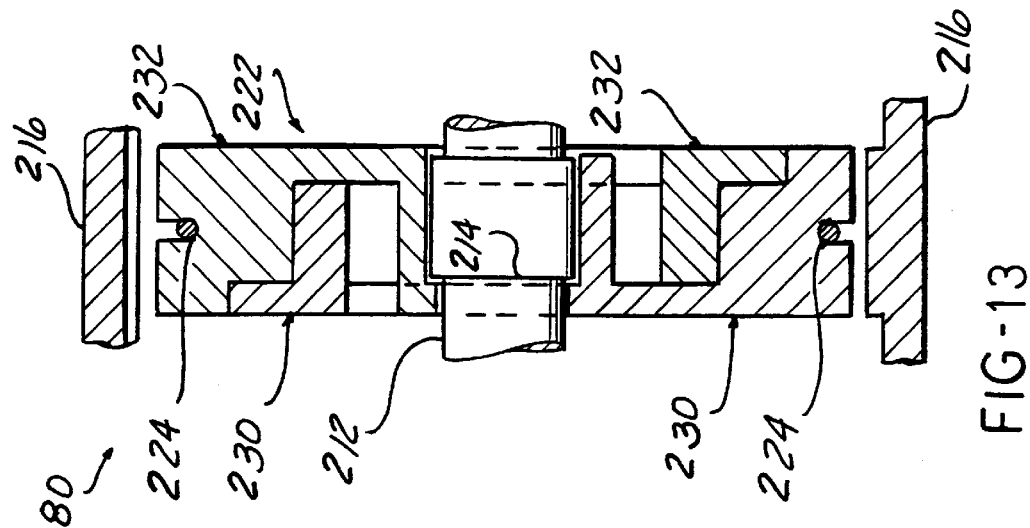
FIG. 13 is a cross-sectional view of the clutch according to the present invention in a disengaged position taken along a line 13—13 as shown in FIG. 12.
Figure 12:
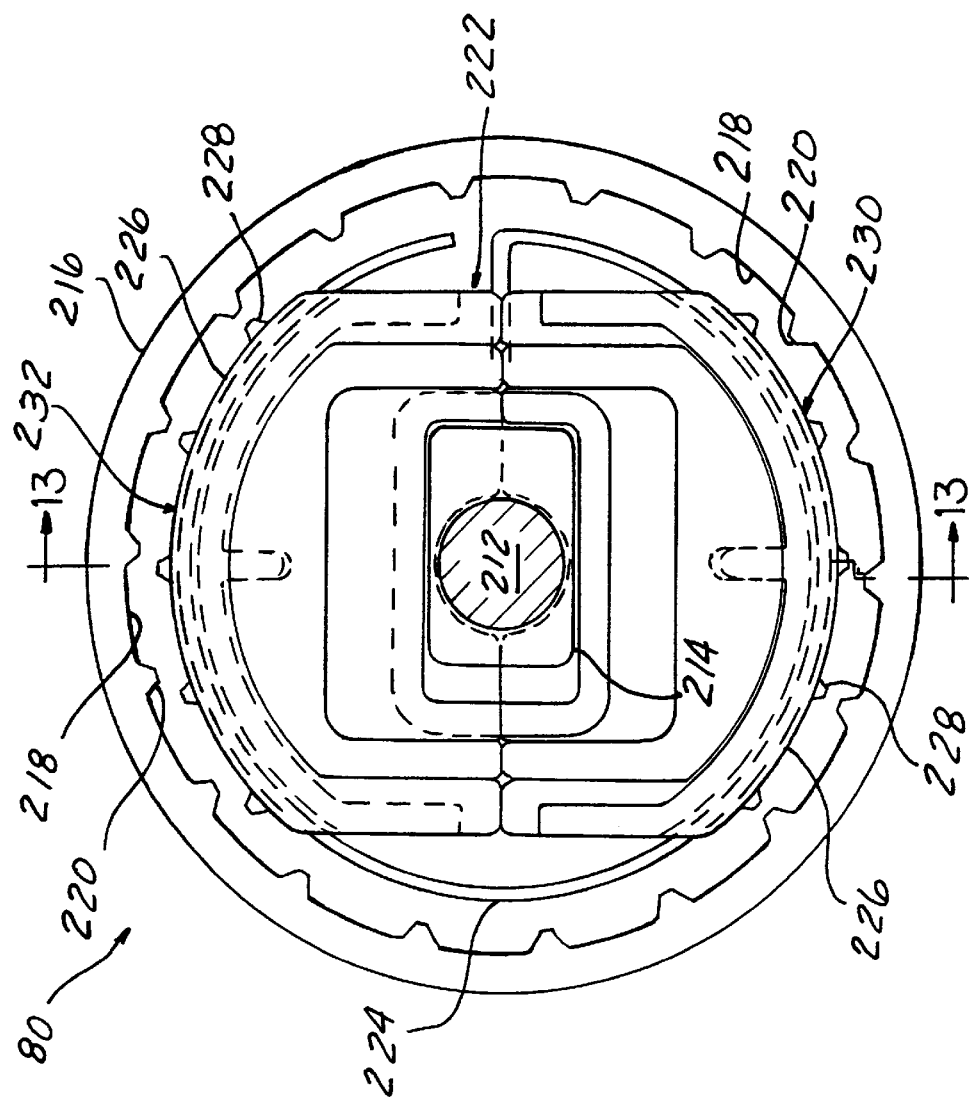
FIG. 12 is a view of a clutch according to the present invention in a disengaged position with certain portions removed for clarity.

Referring now to FIG. 11, the power drive moves the moveable closure 384 along the fixed path 316 between the open position and the closed position with respect to the portal defining the passage through the barrier. The moveable closure 384 is operably engageable with first and second guide tracks generally extending along first and second edges respectively of the moveable closure 384. The power means 320 moves the fork bolt 326 and striker means 322 when in the primary position (shown schematically in phantom lines at 326a in FIG. 11) to engage the moveable closure 384 with a seal strip extending substantially around the portal, such that the moveable closure 384 moves sufficiently along the fixed path 316 between an unsealed position (shown schematically in phantom lines at 322 and 326 in FIG. 11) and a sealed position (shown schematically in phantom line at 326b in FIG. 11) to compress the seal strip between the moveable closure 384 and the barrier 310.

The construction of a movable closure assembly including a fixed frame defining a portal through a barrier, where the movable closure is mounted on the frame for movement along a fixed path between a first end limit of movement obstructing the portal and a second end limit of movement allowing ingress and egress through the portal, is well known and commercially available from a variety of sources. The present invention is directed to certain components of a power drive system by means of which a movable closure, such as a sliding door, hatch, roof panel, window, or the like can be power driven into a primary latch position and fully closed position in sealed engagement with the frame around the periphery of the portal, such as a door opening for a sliding door of a vehicle. Various details of such sliding door structures and power drive systems can be obtained from U.S. Pat. No. 5,582,279 issued Dec. 10, 1996, for "Acceleration Reaction Clutch With Override Capability" which is incorporated by reference herein in its entirety.

Typically, a barrier, such as a wall of a vehicle, for example a van-type vehicle, has a movable closure, such as a sliding door located on at least one side of the vehicle. Vans using such sliding doors have been available for years and the structural arrangements by which the doors mounted on the vehicle for movement between the closed position, where the door is sealingly seated in a door opening, and an open position, where the door is disposed at the side of the van rearwardly of the door opening, are well known. In the standard arrangement, the door is latched in its closed position, typically by mechanical latches at the front and rear edges of the door, and the latches are mechanically linked to a latch actuator mounted within the door to be simultaneously released by actuation of manually operated door handles, or electronically as part of a power door drive system. In many cases, the rear latch may include a power-driven striker mechanism which is latchingly engaged with the door as it approaches its closed position and is power driven to move the latched door to its fully closed position. The employment of an electronic control unit enables the power drive for the door to be operated in a safe and efficient manner, as by providing the door with an antipinch capability by automatically stopping the drive if an object becomes trapped between the closing door and the door frame, providing for express operation, and eliminating the need for limit switches to sense specific door positions. Electronic control units capable of being programmed to perform these, and similar functions, are well known and commercially available from a variety of sources.

The barrier is a construction forming an extended indefinite surface preventing or inhibiting the passage of persons or things, and can include a wall, ceiling, roof, or cover for a stationary structure or a movable vehicle, such as the vertically extending wall 310 of a van-type vehicle illustrated in cross section in FIG. 11. The portal is structure defining an opening 312 through the barrier 310 for passage of persons or things, such as the framing of a door, window, hatch, or roof panel opening. The movable closure 314 is an obstructive structure whose presence in or before a passage bars traffic through the passage and is mounted to move in a regular, repetitive, predetermined path 316 with respect to the portal 312 so as to alternately open or close the passage, and can take the form of a hatch, a sliding window, a roof panel, or a sliding door.

Figure 16:
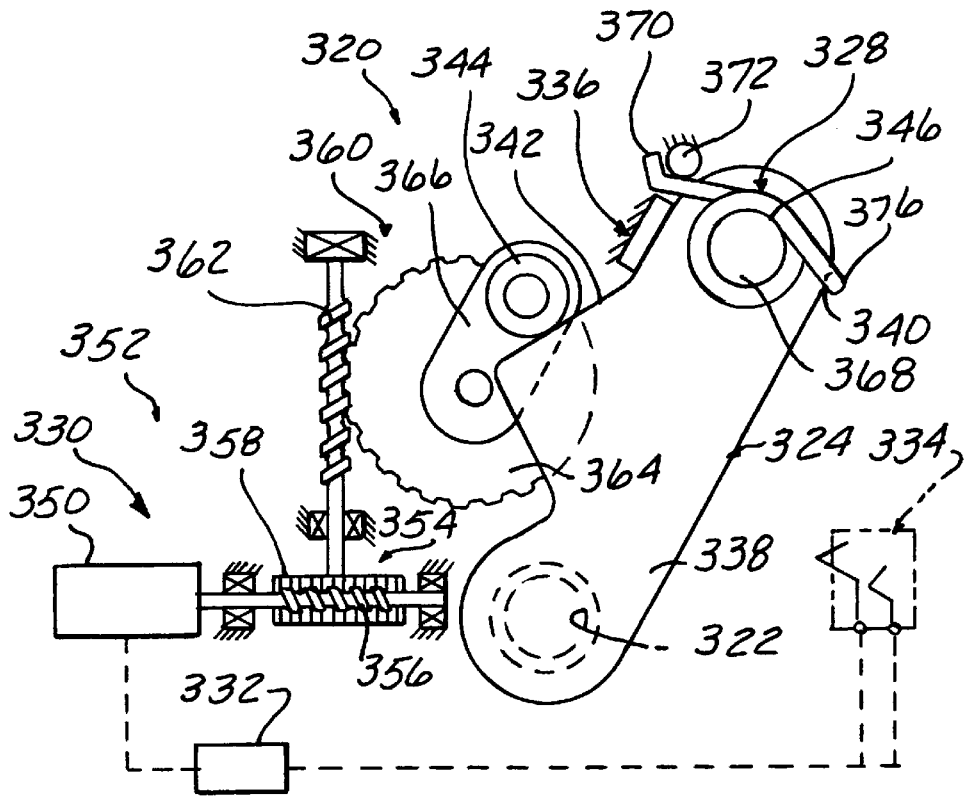
FIG. 16 is a simplified schematic view of a power striker in a first position according to the present invention.
Figure 17:
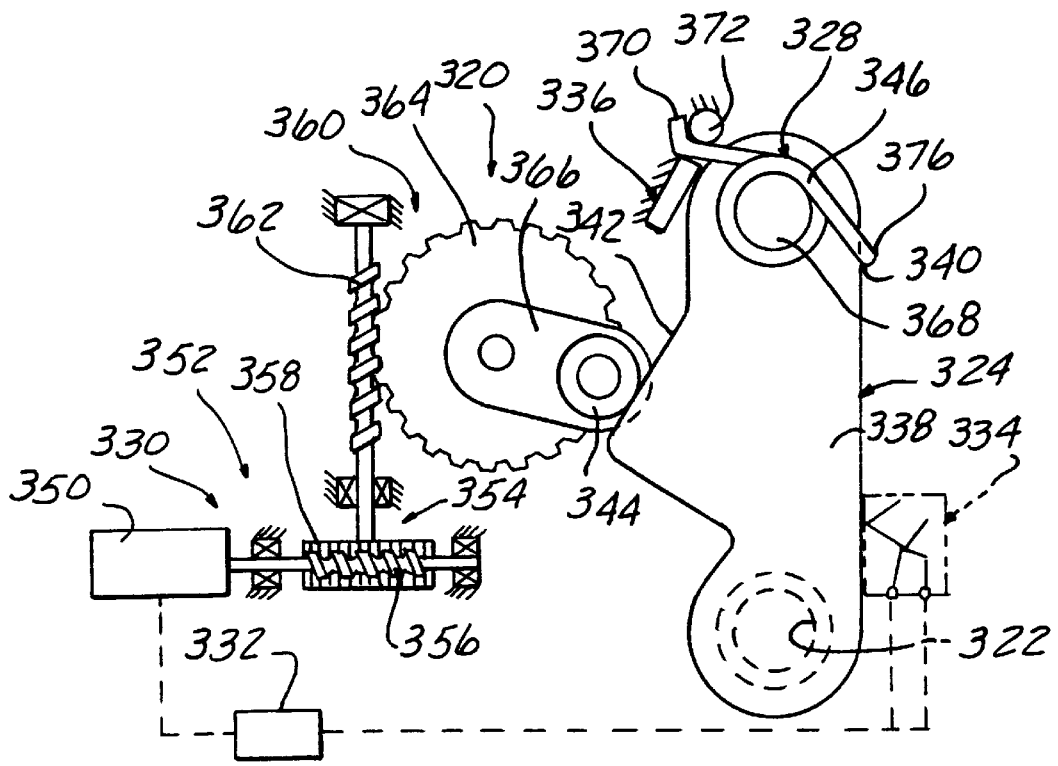
FIG. 17 is a simplified schematic view of a power striker in a second position according to the present invention.

Referring now to FIGS. 16 and 17, a simplified schematic of a power striker apparatus 320 is illustrated. In FIG. 16, the power striker apparatus 320 is shown with the striker 322, such as a striker pin, fork bolt, U-shaped striker, or the like, in a first outboard position with respect to a longitudinally extending centerline of the vehicle. FIG. 17 illustrates the power striker apparatus 320 with the striker 322 in a second position corresponding to an inboard position with respect to a longitudinally extending centerline of the vehicle. Base means 324 is provided for supporting the striker 322 for movement between the first position illustrated in FIG. 16 and the second position illustrated in FIG. 17 with respect to the latch mechanism 326 illustrated in phantom in FIG. 11. Biasing means 328 urges the base means 324 toward the first position. Drive means 330 operably moves the base means 324 from the first position against the urging of the biasing means 328 toward the second position. The drive means 330 in response to further clockwise movement of the illustrated embodiment can selectively release the base means 324 when in the second position, such that the striker 322 snaps back to the first position in response to the urging of the biasing means 328 to inertially drive the striker 322 into the primary latch position from the secondary latch position with respect to the latch mechanism 326. Control means 332 operably actuates the drive means 330 for moving the base means 324 between the first and second positions. Sensor means 334 signals when the base means 324 is in the second position. Stop means 336 limits movement of the base means 324 to define the first position and absorbs impact from the base means 324 during return movement to the first position from the second position.

Figure 18:
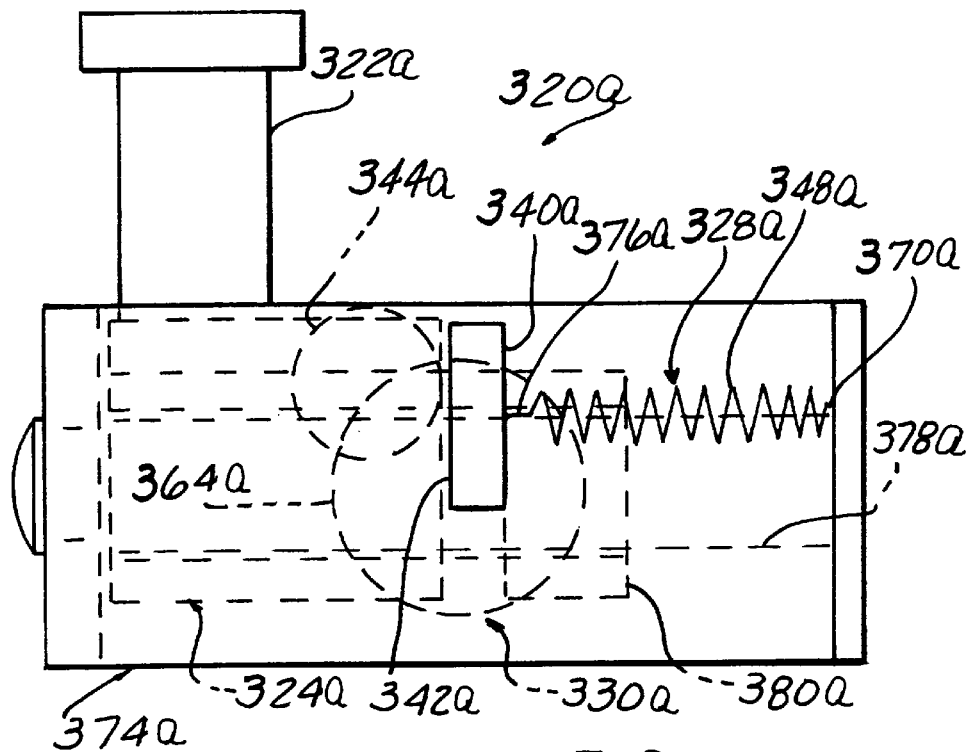
FIG. 18 is a simplified schematic view of an alternative configuration for a power striker apparatus in the first position according to the present invention.
Figure 19:
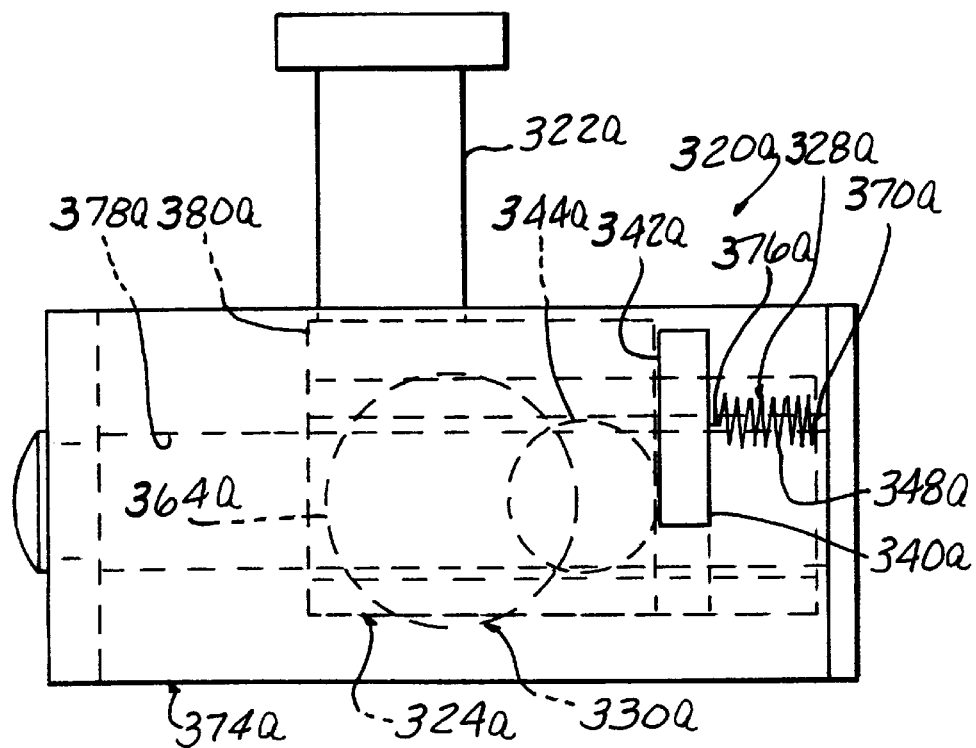
FIG. 19 is a simplified schematic view of the alternative configuration of the power striker apparatus in the second position according to the present invention.

In the preferred embodiment illustrated in FIGS. 11, 16, and 17, the base means 324 can include a rotatable arm 338 for supporting the striker 322 for movement between the first and second positions. The arm 338 can include a seat 340 and a cam surface 342 formed thereon. The biasing means 328 operably engages with the seat 340 of the arm 338 for urging the arm 338 toward the first position. The drive means 330 preferably includes a roller 344 engageable with the cam surface 342 for moving the arm 338 between the first and second positions. The biasing means 328 can include a spring, such as a torsion spring 346 as illustrated in FIGS. 16 and 17, or a compression spring 348a as illustrated in FIGS. 18 and 19. The drive means 330 best seen in FIGS. 11, 16, and 17 preferably includes an electric motor 350 for powering movement of the base means 324 between the first and second positions. Gear means 352 operably connects the electric motor 350 and base means 324 for transferring movement from the motor 350 to the base means 324. The gear means 352 may include a first worm and gear assembly 354 having a first worm 356 and a first gear 358 operably intermeshing with one another. The electric motor drives the first worm 356 in rotation about its longitudinal axis, which in turn rotates the first gear 358 about an axis which is illustrated at a 90° angle with respect to the worm gear axis in FIGS. 16 and 17. The first gear 358 is connected to a second worm and gear assembly 360 including a second worm 362 and a second gear 364. The first gear 358 drives the second worm 362 about its longitudinal axis, which in turn operably intermeshingly engages with the second gear 364 to rotate about an axis disposed at 90° with respect to the longitudinal axis of the second worm as illustrated in FIGS. 16 and 17. A drive arm 366 is connected to the second gear 364 for rotation therewith. The roller 344 is connected to the drive arm 366 spaced radially outward from the rotational axis of the second gear 364. The roller 344 operably engages the cam surface 342 formed on the rotatable arm 338 supporting the striker 322. The rotatable arm 338 is pivotable about pivot member 368. The biasing means 328 is anchored at one end 370, such as against spring pin 372 illustrated in FIGS. 16 and 17, or a wall of housing 374 illustrated in FIGS. 18 and 19, while the opposite end 376 of the biasing means 328 urges the base means 324 toward the first position. As illustrated in FIGS. 16 and 17, the torsion spring 346 is centered on the pivot member 368.

Referring now to FIGS. 18 and 19, the base means 324a can include a housing 374a having a slot or pin 378a disposed therein. A slidable plate 380a can be engaged within the pin 378a of the housing 374a for movement between the first position illustrated in FIG. 18 and the second position illustrated in FIG. 19. The plate 380a supports the striker 322a with respect to the latch mechanism illustrated in phantom in FIG. 11. The plate 380a preferably has a seat 340a and a cam surface 342a formed thereon. The biasing means 328a operably engages between the seat 340a and the housing 374a for urging the plate 380a toward the first position. The drive means 330a preferably includes a roller 344a operably engageable with the cam surface 342a for moving the plate 380a between the first and second positions. The biasing means 328a can take the form of a compression spring 348a with one end 370a disposed against a wall of the housing 374a and an opposite end 376a operably engageable with the seat 340a of the base means 324a. For purposes of clarity, portions of the drive means 330a, control means, and sensor means have been removed and not illustrated in FIGS. 18 and 19. It should be understood that the drive means 330a, control means, and sensor means can take the same form as that illustrated in FIGS. 16 and 17, or any other suitable form for moving the base means 324a between the first and second positions. For purposes of illustration, the second gear 364a and roller 344a are illustrated in FIGS. 18 and 19 with the remaining portions, such as electric motor, gear means, first worm and gear assembly, second worm, and drive arm not illustrated. It should be recognized from the illustration and description of FIGS. 16–19 that the present invention may be used on a rotatable power striker apparatus 320 as illustrated in FIGS. 16 and 17, or a linear sliding power apparatus 320a as illustrated in FIGS. 18 and 19.

Figure 20:
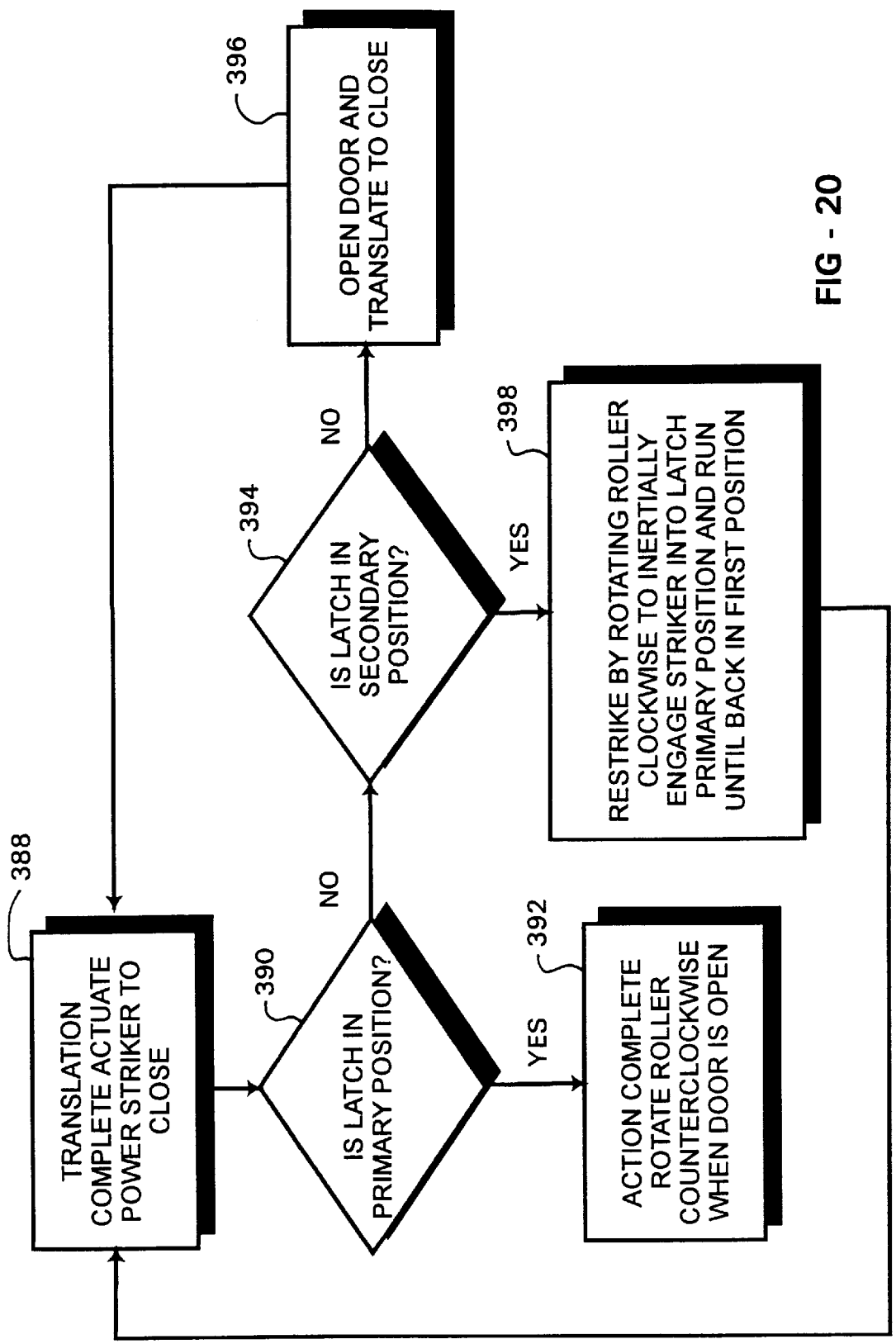
FIG. 20 is a flow diagram of a method of operating and controlling the power striker apparatus according to the present invention.

Referring now to FIGS. 11 and 20, in operation the present invention encompasses an apparatus and method for inertially moving the latch and striker means 382 from a secondary latch position to a primary latch position and for moving the door 314 from a location 384 adjacent the closed position to the fully closed position 386 in sealed engagement with the frame around the periphery of the door opening 312. The method of operation of a power striker apparatus 320 according to the present invention includes the steps of inertially moving the latch and striker means 382 from a secondary latch position to a primary latch position, and moving the door 314 from the location 384 adjacent the closed position to the fully closed position 386 in sealed engagement with the frame around the periphery of the door opening 312.

As best seen in the simplified flow diagram illustrated in FIG. 20, after closing translation of the sliding door 314 is complete, the drive means 330, as seen in FIGS. 11, 16, and 17, is actuated to move the striker 322 from the first position to the second position as illustrated in step 388 of FIG. 20. With the striker 322 in the second position, the control means 332, seen in FIGS. 16 and 17, determines whether the latch 326, seen in FIG. 11, is in the primary latch position with respect to the striker 322 as illustrated in the first inquiry step 390 of FIG. 20. If the control means 332 determines that the latch 326 is in the primary latch position with respect to the striker 322, the control program progresses to step 392 indicating that action is complete and the control means 332 resets so that the roller 344 can be rotated counterclockwise when it is desired by the operator for the door to open. If the latch 326 is determined by the control means 332 not to be in the primary latch position with respect to striker 322, the method of operation progresses to the second inquiry step 394 where the control means 332 determines whether the latch 326, seen in FIG. 11, is in the secondary latch position with respect to the striker 322. If the control means 332 determines that the latch 326 is not in the secondary latch position with respect to the striker 322, the control method progresses to step 396 to signal the door is ajar to indicate that the door needs to be manually or automatically recycled to the open position and translated back to the closed position and the control program returns to the initial step 388. If the control means 332 determines that the latch 326 is in the secondary latch position with respect to the striker 322, the control means 332 restrikes the striker 322 with respect to the fork bolt of the latch mechanism 326 as indicated in step 398 by continuing to rotate the roller 344 clockwise beyond the second position illustrated in FIGS. 17 and 19, so that the roller 344 disengages from the cam surface 342 to cause the base means 324 to be driven from the second position to the first position by the biasing means 328. This action dynamically engages the striker 322 with respect to the fork bolt to move the fork bolt into the primary latch position with respect to the striker 322 before the door 314 with a higher inertia can move in the outboard direction. The roller 344 is rotated clockwise until it returns to the first position illustrated in FIGS. 16 and 18 and the control program is returned to step 388 so that the drive means 330 is actuated to drive the roller 344 clockwise to move the striker 322 from the first position to the second position with the latch 326 now in the primary latch position with respect to the striker 322 thereby pulling the door 314 into the fully closed position 386 with respect to the opening 312 in the wall 310.

Referring now to FIGS. 21A–21C and FIG. 22, the present invention discloses a power sliding van door system using a push/pull drive member disposed adjacent a center, rear position with respect to the movable closure or sliding door. The power sliding van door system opens and closes the door while being under complete electronic control. An external signal is received by the controller to actuate the door, and move the door between an open position and a closed position. The translator drives a tape along the center channel capable of closing the door and assuring a primary latch position of the fork bolt with respect to the striker. Then the power striker pulls the door into full closure where the door is sealed with respect to the frame defining the door opening. The electronic controller regulates the speed of the translator through pulse width modulations, analog modulations, or similar means. The controller knows the position of the door at all times through a Hall effect sensor with a magnet, or optical position sensor, or other positioning devices. This allows for obstacle detection when the door is actuated. For a close to open cycle, an unlatching mechanism is used and then the door is pushed to full open using the tape.

The electronic controller regulates all motion of the door. The center rear hinge roller track is modified to accept a push/pull cable driven by the power translator. The advantage is to pull the roller assembly and door latch assembly into the primary position of the latch. Then the power striker is used to pull the door in and completely seal the door. The advantage of this is the power translator needs less power because it is not required to compress the seals. The unlatched motor unlatches the door, which is normally done by pulling on the handle. The controller compensates for variations in temperature, incline, wear of the systems, dirt and ice in the track, and seal forces. The controller can also have obstruction detection through current sensing.

The translator can be located in a position further rearward of the vehicle from that shown in the attached drawings, provided the translator is connected from the other location by an appropriate track or channel for the drive member or tape. The power striker can be mounted remotely in addition to the local mounting as illustrated in the attached drawings. Preferably, the present invention provides positive latching using the push/pull drive member or DYMETROL tape for the center drive power van sliding door. The key to the positive latching of the present invention is the mechanical advantage to pull the door into the secondary latch position with the drive member, such as DYMETROL tape, in a quiet fashion, and then use a power striker to ensure sealing of the door with respect to the frame. The drive member, or DYMETROL tape pushes the door open, an actuation that takes far less force.

Figure 21A:
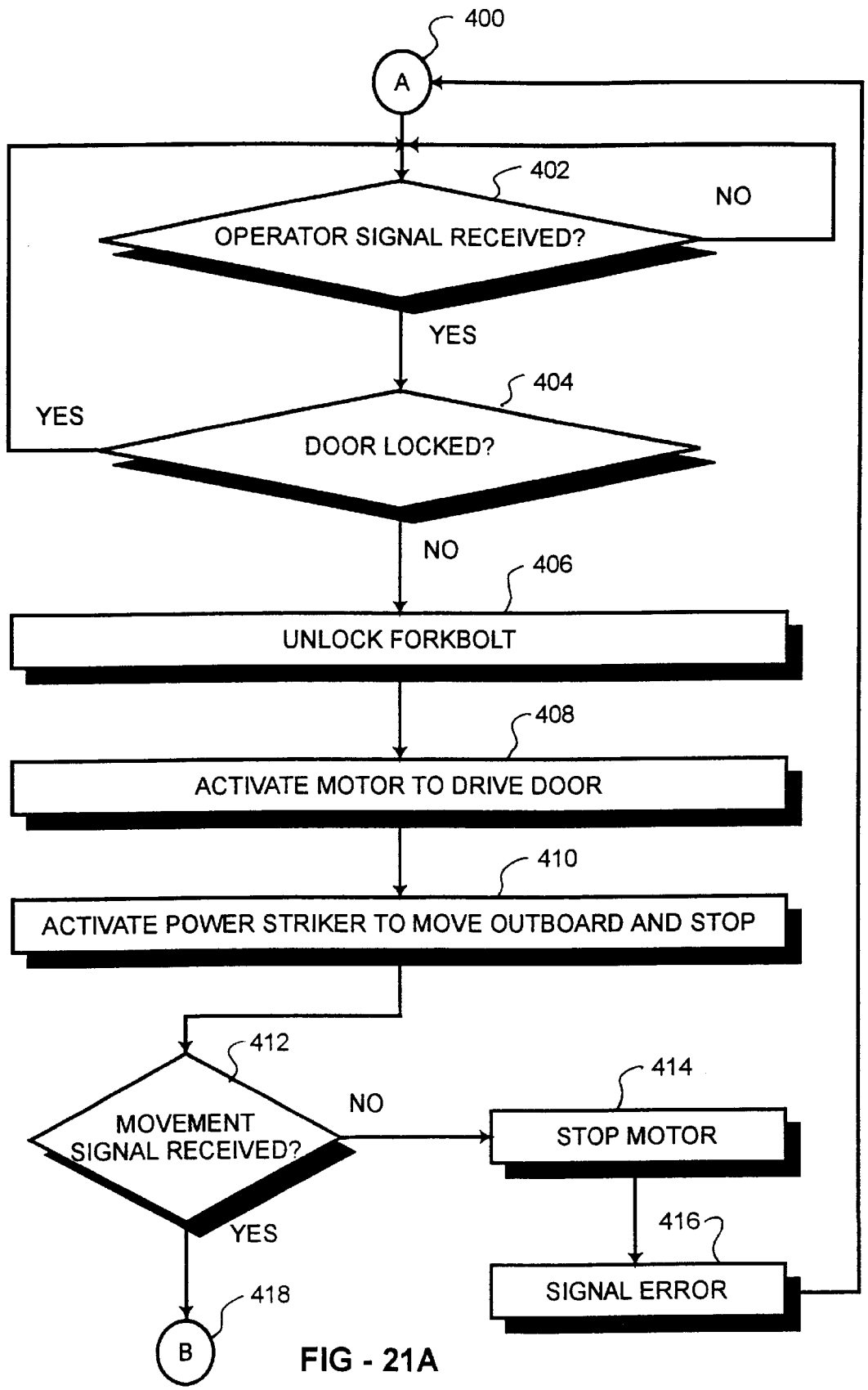
Figure 21B:
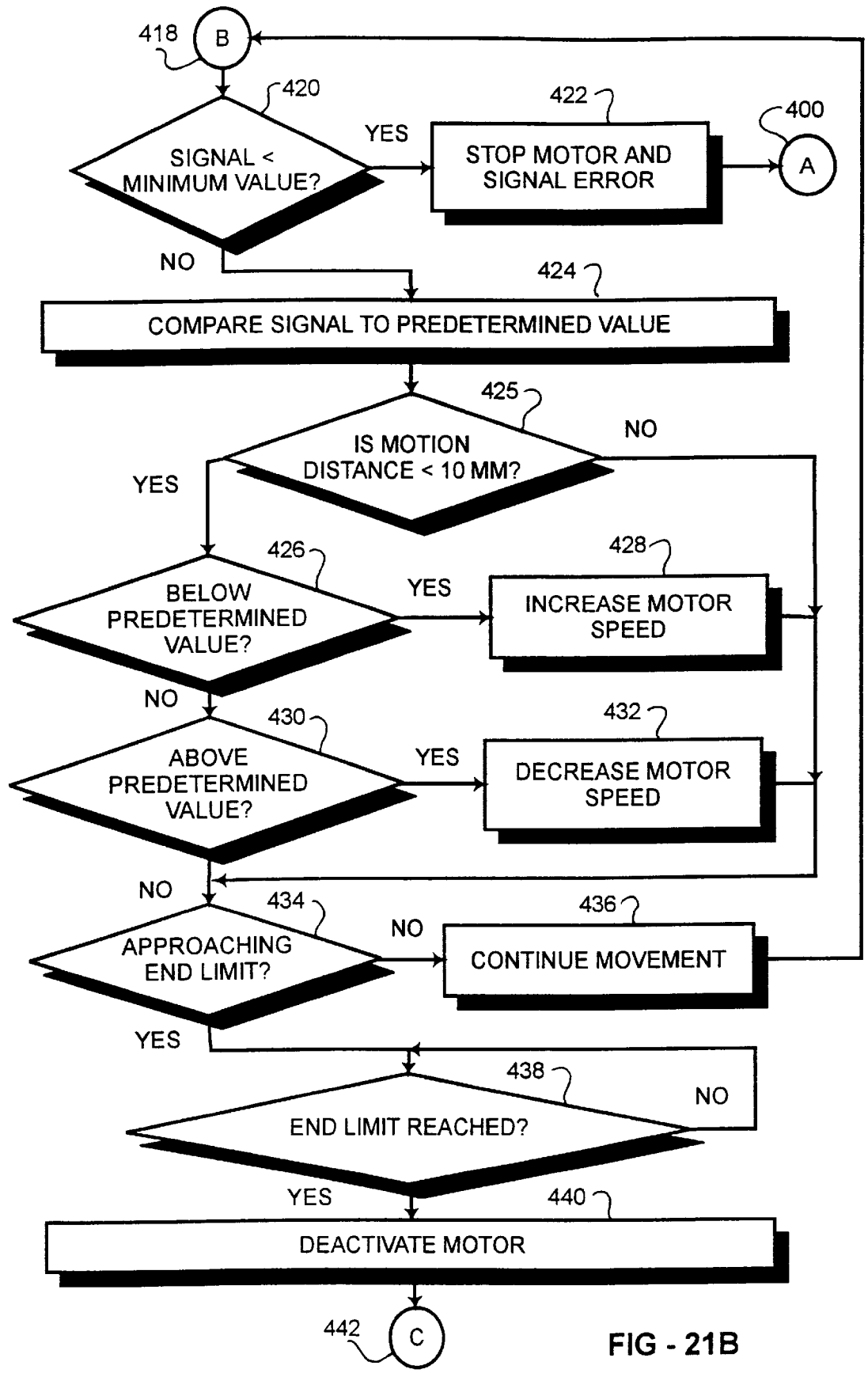
Figure 22:
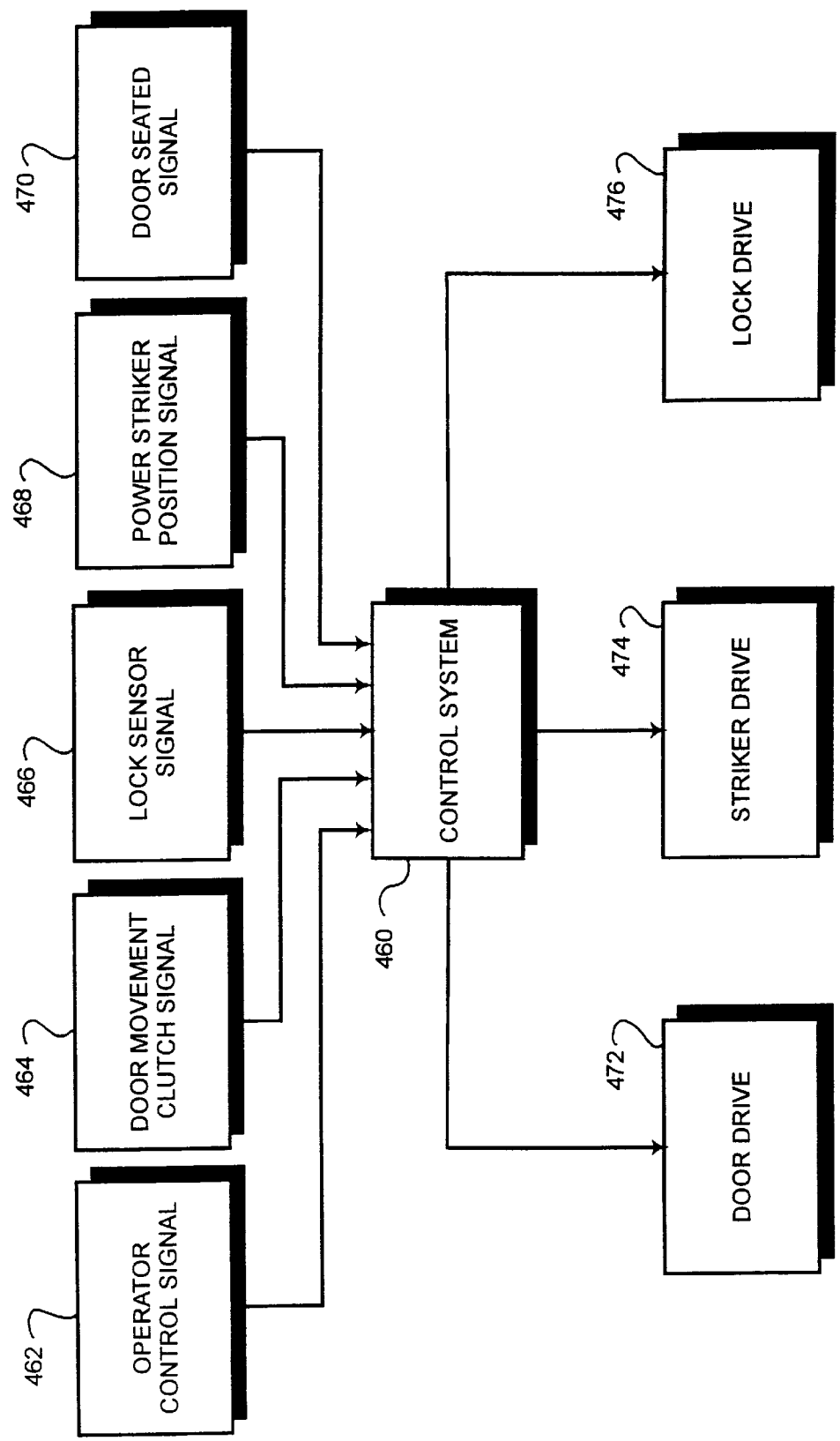
FIG. 22 is a simplified schematic diagram of the control system according to the present invention receiving signals from operator input, door position input, power striker position input, and lock position input for controlling the sliding door drive unit, power striker drive unit, and lock drive unit.

A simplified flow diagram of a method of operating and controlling the sliding door drive unit, power striker drive unit, and lock drive unit is illustrated in FIGS. 21A through 21C. A simplified schematic diagram of the control system according to the present invention for receiving signals from an operator input, door position input, power striker position input, and lock position input, for controlling the sliding door drive unit, power striker drive unit, and lock drive unit is illustrated in FIG. 22. Referring now specifically to FIG. 21A, for purposes of illustration the control sequence is shown starting at point 400 labeled "A". The query step 402 determines whether an operator signal has been received. If the answer to the query is no, the control program returns to a point preceding the query step 402, such as point 400. If the answer to the query step 402 is yes, the control program continues to the next query step 404 where it is determined if the door is locked. If the answer to the query step 404 is yes, the control program returns to a point preceding the query step 402, such as point 400. If the answer to query step 404 is no, the control program continues to step 406 where the fork bolt is unlocked. At step 408, the motor is activated to drive the door. Then the power striker is activated to move from the inboard position to the outboard position in step 410. After the door is activated, the control program continues to query step 412 to determine if a movement signal has been received. If the answer to query step 412 is no, the control program branches to step 414 where the motor is stopped, and then continues to step 416 where an error signal is generated prior to returning to point 400. If the answer to the query step 412 is yes, the program continues to point 418 labeled "B".

Referring now to FIG. 21B, point 400 labeled "A" and point 418 labeled "B" are repeated in this figure for purposes of clarity to refer back to the same points labeled "A" and "B" respectively in the original FIG. 21A. From point 418 labeled "B", the control program proceeds to query step 420 where the movement signal is compared to a minimum value to determine if the movement signal is less than the minimum value. If the answer to the query step 420 is yes, the program continues to step 422 where the motor is stopped and an error signal is generated prior to returning to the beginning of the control program at point 400 labeled "A". If the response to the query step 420 is no, the control program continues to step 424 where the movement signal is compared to a predetermined value. In the preferred embodiment, the control program then continues to the query step 425. In the query step 425, the program determines if the distance the door has traveled, or the motion distance is less than ten millimeters. If the answer to the query step 425 is no, then the control program continues on to the query step 434, bypassing any additional motor speed adjustments during door movements along distances exceeding the first ten millimeters of motion. If the answer to the query step 425 is yes, the control program then performs speed adjustment of the door by progressing to query step 426 to determine if the movement signal is below the predetermined value. If the answer to the query step 426 is yes, the control program proceeds to step 428, where the motor speed is increased. If the answer to the query step 426 is no, the control program proceeds to the query step 430 to determine if the movement signal is above the predetermined value. If the movement signal is above the predetermined value in query step 430, the program proceeds to step 432 where the motor speed is decreased. If the program has branched to either step 428 or step 432, after modifying the motor speed, the program continues to a point before the next query step 434. If the answer to the query step 430 is no, the program also continues to the next query step 434. Once the motor speed is set during the first ten millimeters of door travel, the control program will thereafter bypass the motor speed setting query steps 426 and 430 to constantly perform obstruction detection, or stall detection, until the door approaches the end limit of travel. In the query step 434, the control program determines if the door is approaching an end limit of travel. If the answer to the query 434 is no, the control program continues to step 436 where movement of the door is continued and the control program feeds back to point 418 labeled "B". If the answer to query step 434 is yes, the program branches to query step 438, where the control program determines if the end limit of travel of the door has been reached. If the answer to the query step 438 is no, the control program feeds back to beginning of query step 438. When the end limit of travel of the door has been reached, and the answer to the query step 438 is yes, the program continues on to step 440. In step 440, the motor is deactivated. The control program then continues on to point 442 labeled "C".

Referring now to FIG. 21C, common point 442 labeled "C" and common point 400 labeled "A" are depicted for purposes of simplifying the flow diagram extending between the three FIGS. 21A, 21B, and 21C. In each case, it should be understood that the points 400, 418, and 442 labelled "A", "B", and "C", respectively, are the same individual points in each flow diagram. From point 442 labeled "C", the control program progresses to query step 444, where the control program determines whether the door needs to be latched and seated. If the answer to the query step 444 is no, the control program returns to the beginning point 400 labeled "A". If the answer to the query step 444 is yes, the control program continues to step 446 where the door is latched. The program then continues to activate the power striker to move the door inboard as illustrated in step 448. The control program then continues to query step 450 to determine if the door was actually seated. If the door was properly seated in response to the query step 450, the control program returns to point 400 labeled "A". If the answer to the query in step 450 is no, the program continues to step 452 where the power striker is released to the outboard position in an attempt to drive the fork bolt and the striker into the primary latch position from the secondary latch position as discussed in greater detail above. After releasing the power striker to the outboard position in step 452, the control program progresses to query step 454 to determine if a flag was previously set. If the flag was previously set, the control program branches to step 456 to signal an error and to reset the flag prior to returning to the beginning point 400 labeled "A". Generally, the error signal would indicate a door ajar condition, since the door failed to properly seat after repeated attempts. If the answer to the query in step 454 is no, the control program continues to step 458 where a flag is set prior to the control program feeding back to the program step 448 in an attempt to reseat the door in a sealed condition prior to generating an error signal through step 456 as previously described.

It should be understood that FIG. 21B describes the control program according to the present invention with reference to a movement signal, such as the signal generated by the sensor 88 attached to the clutch 80 as best seen in FIG. 8, or as illustrated by the sensor 88a and clutch 80a in FIG. 9. This control program can be used to monitor the speed and location of the door as it moves between the end limits of travel and can automatically detect an obstruction in order to stop the door in response to a no movement signal or a movement signal below a minimum value when the door is at a position not approaching the end limit of travel. The query step 434 branches the control program out of the obstruction testing loop when the door is approaching the end limit of travel, since the movement signal would fall below the minimum value as the end limit of travel is reached.

It should further be recognized that the present invention can also encompass a modified control program where the motor is monitored and controlled in response to sensing the amount of current supplied to the motor driving the door between the end limits of travel. The current sensing can be used for obstacle detection, either in addition to, or as an alternative to the movement signal specifically illustrated in the control program flow diagram. In the case of using current sensing, the control program would determine whether the current signal was greater than a predetermined value in query step 420. If the current signal is greater than a maximum value in query step 420, the program would branch to step 422 in order to stop the motor and generate an error signal prior to returning to the starting point 400 labeled "A". If the current signal was less than a maximum value in query step 420, the program would branch to the step 424 to compare the current signal to a predetermined value. The control program would then proceed to the query step 426 to determine if the current signal was below the predetermined value. If the answer to the query step 426 is yes, the control program would branch to step 428, and in the instance of the current signal being below the predetermined value, the motor speed would be decreased, rather than increased as illustrated in FIG. 21B. If the answer to the query step 426 is no, the control program would continue to query step 430 where the program would determine if the current signal is above the predetermined value. If the answer to the query step 430 in the current sensing case is yes, the program would branch to step 432, which indicates the current signal is above the predetermined value, where the motor speed would be increased rather than decreased as illustrated in FIG. 21B. If the answer to the query step 430 is no, after making the appropriate motor speed change in step 428 or step 432, the control program continues on to query step 434 where the program determines if the door is approaching the end limit of travel. The remaining portion of the control program would be the same as that illustrated in FIGS. 21A, 21B, and 21C.

Referring now to FIG. 22, the control system 460 is illustrated schematically connected to the various signal inputs and controlled outputs. An operator control signal 462 can be sent to the control system 460. A door movement clutch signal 464 can be sent to the control system 460. A lock sensor signal 466 can be sent to the control system 460. A power striker position signal 468 can be sent to the control system 460. A door seated signal 470 can also be sent to the control system 460. In response to one or more of these signals, the control system 460 can generate output according to a control program stored in memory to activate one or more of the door drive 472, the striker drive 474, and/or the lock drive 476. A simplified control program has been shown schematically in the flow diagram illustrated in FIGS. 21A, 21B, and 21C.

Figure 23:
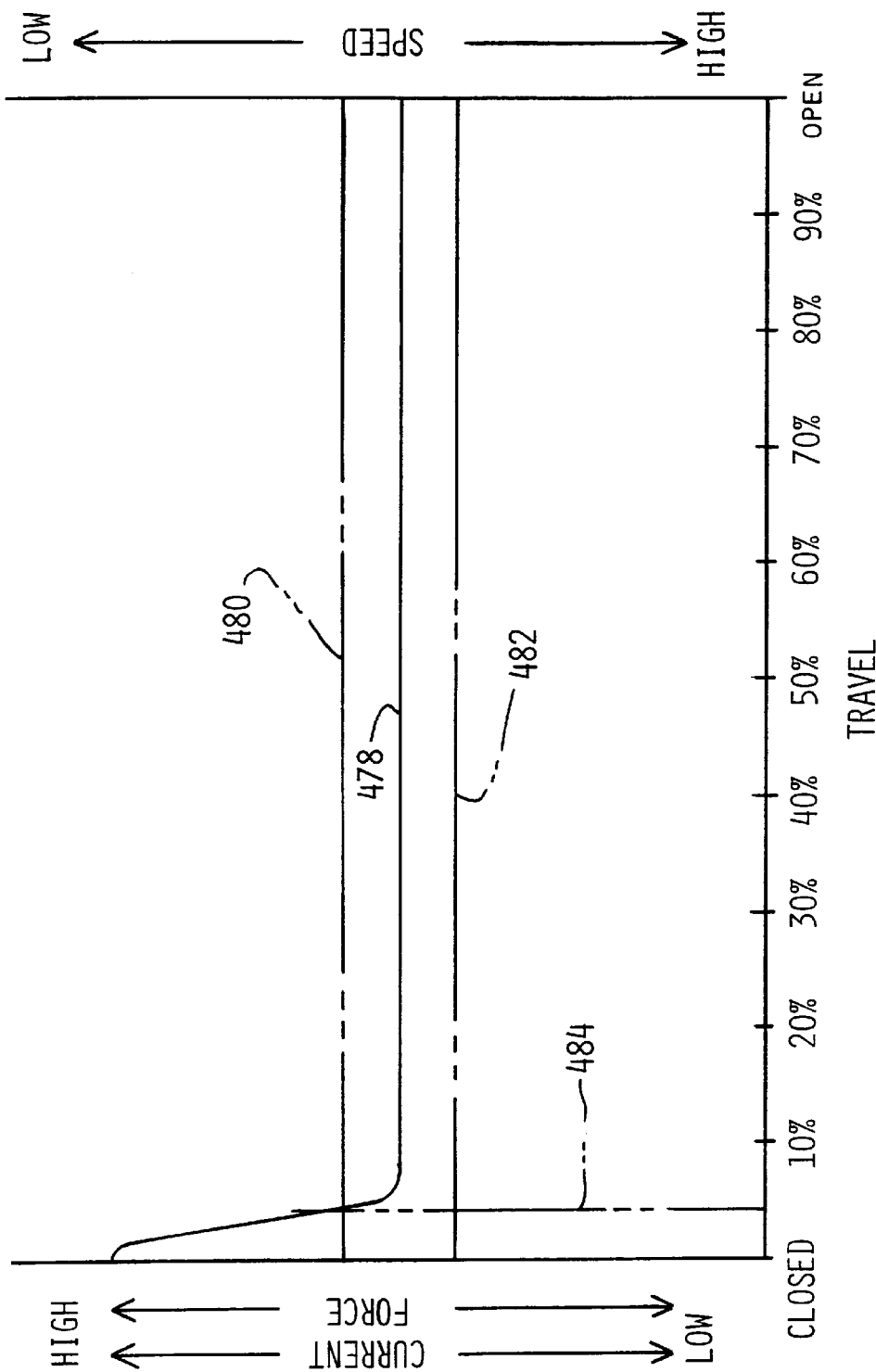
FIG. 23 is a graph illustrating the travel of the door between the closed and open end limits of travel along the horizontal axis, with speed along the right vertical axis and current or force along the left vertical axis illustrating the typical movement of a sliding door and the characteristics of speed, current, and/or force with minimum and maximum predetermined values illustrated by phantom lines 480 and 482 and a vertically extending phantom line 484 depicting the position adjacent an end limit of travel that is excluded from the obstacle detection portion of the control program.

Referring now to FIG. 23, a graph is provided illustrating the travel of the door along the horizontal axis between the closed position and the open position. Along the right-hand vertical axis, the speed is illustrated with high speed door movement at the lower vertical position and low speed door movement at the upper vertical position. Along the left vertical axis, the force is illustrated with low force at the lower vertical position and high force at the upper vertical position. The current is also shown on the left vertical axis with low current at the lower vertical position and high current at the upper vertical position. The solid line 478 graphically illustrates by way of example and not limitation a force required for closing and/or opening a door of a vehicle under normal operating conditions and moving the door between the closed position and an opened position in either direction. As can be seen, the solid line 478 adjacent the closed position end limit of travel requires high force to bring the door into the primary latch position and to seal the door with respect to the frame of the vehicle. According to the present invention, the control program can provide an upper predetermined value illustrated by phantom line 480 and a separate lower predetermined value illustrated by phantom line 482 for purposes of monitoring the door movement based on one or more parameters of force, speed, and/or current, or any combination thereof. If the motor current as illustrated by solid line 478 crosses above the predetermined value illustrated by phantom line 480 while moving between the opened position and closed position, and while outside of the area excluded as the door approaches the closed position end limit of travel illustrated by vertically extending phantom line 484, the control program can automatically stop the door in response to such line crossing as an indication of a detection of an obstruction in the path of the door. In the alternative, or in combination, if the speed illustrated by solid line 478 were to drop below the predetermined value as illustrated by phantom line 482, the motor could be deactivated, since such a crossing of the lines would indicate that the door had encountered an obstruction. In addition, or in the alternative, the predetermined values illustrated by phantom lines 480 and 482 can be used to control the desired minimum and/or maximum speed of the door, or maximum and minimum current to be sent to the motor as the door travels between the two end limits of travel, excluding the portion adjacent the closed position end limit of travel illustrated by the vertically extending phantom line 484 where the door is entering the fully closed, latched, and seated position with respect to the frame.

Figure 24:
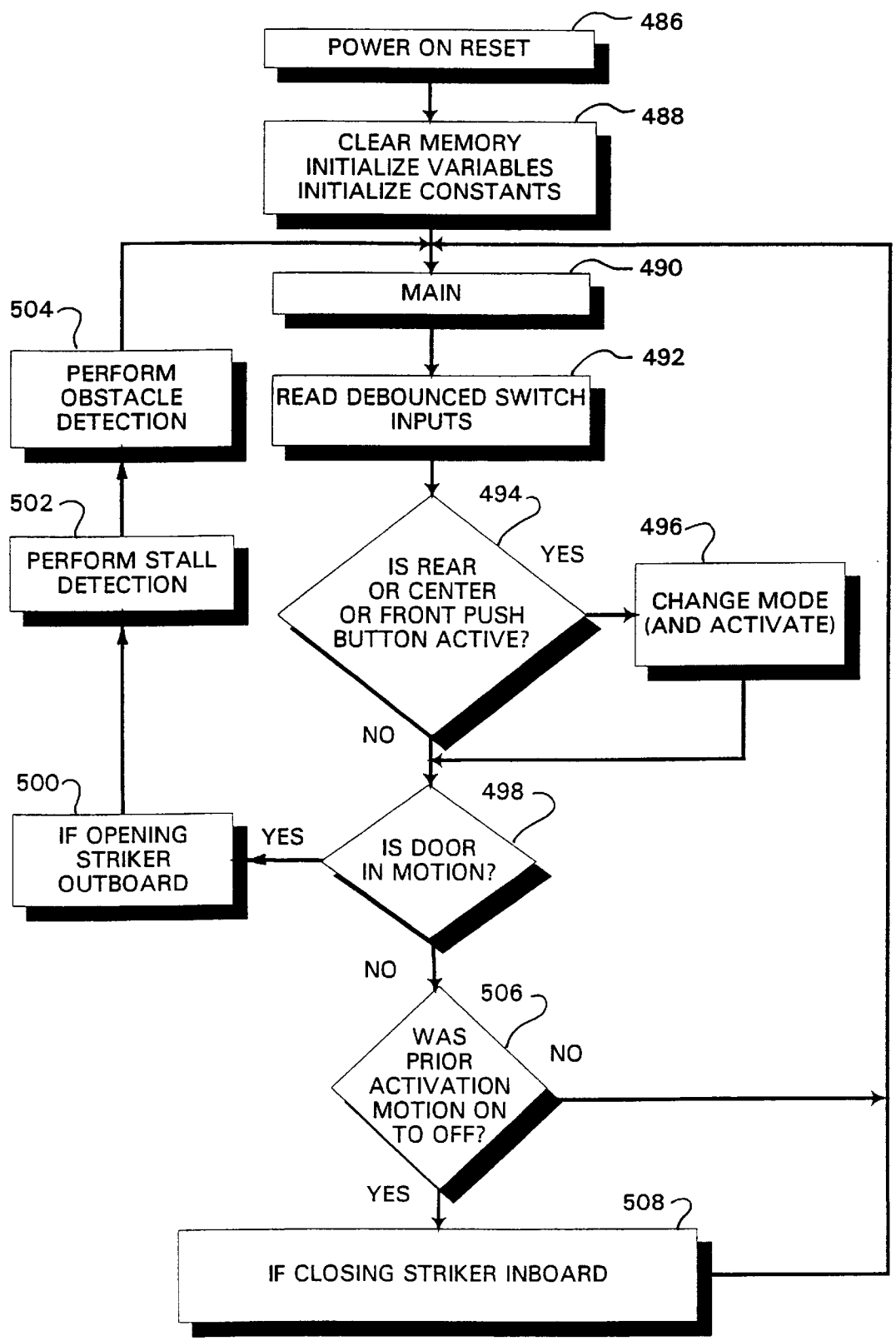
FIG. 24 is an alternative flow diagram for a power sliding van door closure control program according to the present invention.

Referring now to FIG. 24, an alternative power sliding van door closure software functional flow chart is illustrated. The control program begins with step 486 where a power on reset is performed. After the power on reset step 486, the control program continues to step 488 where the program clears memory, initializes variables, and initializes constants. After initialization in step 488, the control program continues to step 490 which is the beginning of the main program after completing the reset step 486 and initialization of step 488. As the program continues past the beginning of the main program at step 490, the program reads the debounced switch inputs in step 492. The program then continues to query step 494 where the control program determines if the rear, or center, or front push button is active. If any of the three buttons are active, the control program branches to step 496, where the mode of operation is changed to activate the appropriate components of the system. According to the present invention, the door has four modes, namely: a mode 0 corresponding to an off mode; a mode 1 corresponding to a door opening mode; a mode 2 corresponding to another off mode; and mode 3 corresponding to a door closing mode. If the answer to query step 494 is no, or after completing the change mode step 496, the control program continues to query step 498 where the control program determines if the door is in motion. If the answer to query step 498 is yes, the control program branches to step 500 that conditionally moves the striker to an outboard position if the door is opening, or in mode 1. After step 500, the control program continues to step 502 where the control program performs a stall detection. After the stall detection in step 502, the control program then performs an obstacle detection in step 504. After the obstacle detection in step 504, the control program returns to the beginning of the main program at step 490. If the answer to query step 498 is no, the control program continues to query step 506, where the program determines if the prior activation motion was on to off. If the answer to query step 506 is yes, the control program branches to step 508 where the striker is moved to the inboard position conditionally if the door was closing, or in mode 3. If the answer to the query step 506 was no, or after the conditional movement of the striker inboard if the door was closing, the program continues and returns to the beginning of the main program corresponding to step 490.

Referring now to FIG. 25, the system control module 510, such as a microcomputer, can receive signals from one or more signal generators, such as a side pillar switch 512, a rear pillar switch 514, and/or a driver side switch 516 as input. In addition, or alternatively, the system control module 510 can receive one or more signals from a door lock and unlock sensor 518, a remote keyless entry signal generator 520, and/or automatic transmission position signal generator 522 capable of providing signals corresponding to the park position, reverse position, neutral position, drive position, and low drive position of the automatic transmission. In addition, or alternatively, the system control module 510 can receive a signal from the vehicle ignition 524 and/or a signal from the battery 526. In response to one or more of the signals generated from these various components, the system control module 510 can generate output signals in accordance with a program stored in memory to send and/or receive signals from one or more of the following components, namely: translator gear, motor, and sensor assembly 528 and/or power striker gear, motor, and sensor assembly 530. In the alternative, or additionally, the system control module 510 can generate an output signal through the door contacts 532 to the power unlatch motor and gear assembly gear 534 and/or to the door ajar switch 536.

According to the preferred and alternative configurations of the present invention, a control system is provided for a power drive for moving a moveable closure, such as a sliding van door along a fixed path between an open position and a closed position with respect to a portal defining a passage through a barrier, such as the side of a motor vehicle. The control system according to the present invention accommodates manual operation through disengagement of the clutch when the drive motor is deactivated, or by providing over drive capability through the clutch, to disengage the clutch if the door is driven manually at a speed faster than the free wheeling speed of the drive motor. In addition, the control system of the present invention provides powered operation of the sliding door of a vehicle in forward and rearward movement along the fixed path between an opened position and a closed position with a power striker for moving the sliding door from a position adjacent the closed position to a fully closed and sealed position with respect to a frame defining the opening through the vehicle's side wall. The control program according to the present invention provides accurate position sensing of the location of the door whether the door is manually operated or power operated. In addition, the control program according to the present invention performs obstacle detection in one or more ways, namely through speed detection, current detection, and/or force detection. The control program according to the present invention can also perform stall detection to determine if the door has stopped moving or failed to move for any reason. The control program according to the present invention also provides for multiple attempts to seat the door in the fully closed and sealed position with respect to the frame. The flag setting described with respect to step 456 and 458 of FIG. 21C can be modified if desired to increase the number of attempts from the two attempts illustrated in FIG. 21C to any predetermined value by incrementally increasing the flag setting by one until the query step 454 determines that the flag is equal to or greater than the predetermined number of attempts selected. After the predetermined number of attempts have been made to fully close and seal the door, the program can branch to step 456 to signal a door ajar error while resetting the flag to zero.

Various details of such sliding door structures and power drive systems can be obtained from U.S. Pat. No. 5,582,279 issued Dec. 10, 1996, for "Acceleration Reaction Clutch With Override Capability" which is incorporated by reference herein in its entirety. Additional information regarding the rear-center-mounted door actuator can be found in U.S. patent application Ser. No. 08/908,126 filed Aug. 11, 1997. Additional information regarding the power striker can be found in U.S. patent application Ser. No. 08/900,048 filed Jul. 24, 1997, now U.S. Pat. No. 5,765,886 issued Jun. 16, 1998, which is incorporated by reference herein.

While the invention has been described in connection with what is presently considered to be the most practical and preferred embodiment, it is to be understood that the invention is not to be limited to the disclosed embodiments but, on the contrary, is intended to cover various modifications and equivalent arrangements included within the spirit and scope of the appended claims, which scope is to be accorded the broadest interpretation so as to encompass all such modifications and equivalent structures as is permitted under the law.

What is claimed is:

1. An apparatus for opening and closing a sliding door relative to a door frame of a vehicle having a centerline, the sliding door being of a type providing for automatic and manual manipulation of the door with respect to the door frame and requiring nonlinear movement of the door between an opened position and a closed position including longitudinal movement along a first portion of a fixed path substantially parallel to the door frame and transverse movement along a second portion of the fixed path into sealing engagement with the door frame, the apparatus comprising:

first means including a reversible electric motor mounted adjacent a midway position along a rear pillar of the door frame defining an opening for selectively driving the door in a first direction and in a second direction opposite from the first direction;

second means including a second electric motor mounted adjacent the midway position along the rear pillar of the door frame for selectively driving a striker between an inboard position and an outboard position with respect to the centerline of the vehicle; and control means responsive to at least one input signal for selectively actuating said first and second means in accordance with a control program stored in memory.

2. The apparatus of claim 1 further comprising:

a fork bolt connect to the door to be operably engaged with the striker when the door is in the closed position, the fork bolt being selectively operable between a locked condition and an unlocked condition when engaged with the striker; and lock means for selectively holding the fork bolt in the locked condition in response to the control means.

3. The apparatus of claim 2 further comprising:

at least one sensor positioned with respect to the fork bolt for generating said input signal, said input signal including an input signal to the control means representative of the locked condition and the unlocked condition.

4. The apparatus of claim 1 further comprising:

a control signal generator for generating said input signal, said input signal including an input signal to the control means in response to operator input.

5. The apparatus of claim 1 further comprising:

at least one sensor positioned between the door and the first means for generating said input signal, said input signal including an input signal to the control means representative of movement of the door along the fixed path while accommodating manual and powered manipulation of the door along the fixed path.

6. The apparatus of claim 1 further comprising:

at least one sensor for generating said input signal, said input signal including an input signal to the control means representative of an actual position of the door along the fixed path of travel between the opened position and the closed position.

7. The apparatus of claim 1 further comprising:

at least one sensor positioned with respect to the striker for generating said input signal, said input signal including an input signal to the control means representative of the inboard position and the outboard position of the striker.

8. The apparatus of claim 1 further comprising:

at least one sensor positioned with respect to the frame and the door for generating said input signal, said input signal including an input signal to the control means representative of a door ajar condition.

9. The apparatus of claim 1 wherein the control means further comprises:

a central processing unit for receiving said at least one input signal and for generating at least one output signal in accordance with the control program stored in memory.

10. The apparatus of claim 1 wherein the control means further comprises:

means for controlling a speed of the door while moving between the opened position and the closed position in response to said input signal from the first means, wherein the first means includes a sensor mounted to a portion of a clutch disposed between the reversible electric motor and the door.

11. The apparatus of claim 1 wherein the control means further comprises:

means for detecting an obstruction along the fixed path of the door while the door is moving between the opened position and the closed position in response to said input signal from the first means, wherein the first means includes a sensor connected to a portion of a clutch disposed between the reversible electric motor and the door.

12. A method for opening and closing a sliding door relative to a door frame of a vehicle having a centerline, the sliding door being of a type providing for automatic and manual manipulation of the door with respect to the door frame and requiring nonlinear movement of the door between an opened position and a closed position including longitudinal movement along a first portion of a fixed path substantially parallel to the door frame and transverse movement along a second portion of the fixed path into sealing engagement with the door frame, the method comprising the steps of:

- selectively driving the door in a first direction and in a second direction opposite from the first direction with first means including a reversible electric motor mounted adjacent a midway position along a rear pillar of the door frame defining an opening;
- selectively driving a striker between an inboard position and an outboard position with respect to the centerline of the vehicle with second means including a second electric motor mounted adjacent the midway position along the rear pillar of the door frame; and
- selectively actuating said first and second means in accordance with a control program stored in memory with control means responsive to at least one input signal.

13. The method of claim 12 further comprising the step of:
selectively holding a fork bolt in a locked condition in response to the control means with lock means, the fork bolt being connected to the door to be operably engaged with respect to the striker when the door is in the closed position, the fork bolt being selectively operable between the locked condition and an unlocked condition when engaged with the striker.

14. The method of claim 12 further comprising the step of:
generating said input signal, said input signal including an input signal to the control means representative of a locked condition and an unlocked condition with at least one sensor positioned with respect to a fork bolt.

15. The method of claim 12 further comprising the step of:
generating said input signal, said input signal including an input signal to the control means in response to operator input with a control signal generator.

16. The method of claim 12 further comprising the step of:
generating said input signal, said input signal including an input signal to the control means representative of movement of the door along the fixed path with at least one sensor positioned between the door and the first means, while accommodating manual and powered manipulation of the door along the fixed path.

17. The method of claim 12 further comprising the step of:
generating the input signal to the control means, wherein said input signal is representative of an actual position of the door along the fixed path of travel between the opened position and the closed position with at least one sensor.

18. The method of claim 12 further comprising the step of:
generating said input signal, said input signal including an input signal to the control means representative of the inboard position and the outboard position of the striker with at least one sensor positioned with respect to the striker.

19. The method of claim 12 further comprising the step of:
generating said input signal, said input signal including an input signal to the control means representative of a door ajar condition with at least one sensor positioned with respect to the frame and the door.

20. The method of claim 12 wherein the actuating step comprises the steps of:
- receiving said at least one input signal with a central processing unit; and
- generating at least one output signal in accordance with the control program stored in memory with the central processing unit.

21. The method of claim 12 further comprising the step of:
controlling a speed of the door while moving between the opened position and the closed position in response to said input signal from the first means, wherein the first means includes a sensor mounted to a portion of a clutch disposed between the reversible electric motor and the door.

22. The method of claim 12 further comprising the step of:
detecting an obstruction along the fixed path of the door while the door is moving between the opened position and the closed position in response to said input signal from the first means, wherein the first means includes a sensor connected to a portion of a clutch disposed between the reversible electric motor and the door.

* * * * *